US007865002B2

(12) United States Patent  
Basilico et al.

(10) Patent No.: US 7,865,002 B2
(45) Date of Patent: Jan. 4, 2011

(54) METHODS AND APPARATUS FOR COMPUTER AUTOMATED DIAGNOSIS OF MAMMOGRAM IMAGES

(75) Inventors: Robert F. Basilico, Port Saint Lucie, FL (US); Wesley Snyder, Raleigh, NC (US); Albert Basilico, Raleigh, NC (US)

(73) Assignee: Carolina Imaging Specialists, Inc., Raleigh, NC (US)

( * ) Notice: Subject to any disclaimer, the term of this patent is extended or adjusted under 35 U.S.C. 154(b) by 883 days.

(21) Appl. No.: 11/757,926

(22) Filed: Jun. 4, 2007

(65) Prior Publication Data

US 2007/0280525 A1    Dec. 6, 2007

Related U.S. Application Data

(60) Provisional application No. 60/810,369, filed on Jun. 2, 2006.

(51) Int. Cl.
*G06K 9/00* (2006.01)
*A61B 6/04* (2006.01)

(52) U.S. Cl. .......................................... 382/128; 378/37
(58) Field of Classification Search ................. 382/128, 382/129, 130, 131, 132, 133, 134, 225; 378/4, 378/8, 21–27, 37, 101, 901; 600/407, 410, 600/425; 604/74, 236; 128/915, 920, 922
See application file for complete search history.

(56) References Cited

U.S. PATENT DOCUMENTS 5,579,360 A * 11/1996 Abdel-Mottaleb ........... 378/37

| 5,627,907 A * | 5/1997 | Gur et al. ..................... 382/132 |
| 6,246,782 B1 * | 6/2001 | Shapiro et al. .............. 382/128 |
| 6,614,921 B1 * | 9/2003 | Chung et al. ................ 382/131 |

* cited by examiner

*Primary Examiner*—Abolfazl Tabatabai
(74) *Attorney, Agent, or Firm*—Priest & Goldstien, PLLC

(57) ABSTRACT

A system, method, and computer program product for computer analysis of lesions in digitized film-based and/or digital mammograms is described, wherein diagnostic information is combined from two different 2-D mammographic views with the information obtained from one view (or field of view) or mammographic position is processed with information obtained from a second (or a plurality of) related mammographic views to reduce false-positive findings (increase specificity) while preserving or improving diagnostic sensitivity. The digital mammograms or digitized film-based mammograms used, are those that are in current use, and those that conform to the requirements of the American College of Radiology and the Mammography Quality Standards Acts. In a preferred embodiment, a line constructed at the location of the chest wall (or parallel to the chest wall), the location of the nipple, and a line constructed perpendicular to the chest wall datum line and passing through the location of the nipple serve as reference datum across mammogram views. An algorithm locates suspicious lesions in each mammography view and evaluates the concordance of the 3-D spatial locations to rule out physically impossible false-positive findings, based on calculations of spatial relationships. Concordant findings are detected using anatomic landmarks and such findings are reported using terms that are currently in use by physicians and other health care providers in the field of mammography.

7 Claims, 20 Drawing Sheets

DISCORDANT CLUSTER

CONCORDANT CLUSTER

ADJUSTED DISTANCE RADIAL SEARCH

CC VIEW

MLO VIEW

PERPENDICULAR SEARCH

CC VIEW

MLO VIEW

PROJECTED PERPENDICULAR SEARCH

APPARENT MASS, ONE VIEW FINDING

CONCORDANT APPARENT MASS (TRUE MASS)

CONCORDANT APPARENT MASS (TRUE MASS)

PERPENDICULAR SEARCH

CC VIEW

MLO VIEW

METHODS AND APPARATUS FOR COMPUTER AUTOMATED DIAGNOSIS OF MAMMOGRAM IMAGES

The present application claims the benefit of U.S. Provisional Application Ser. No. 60/810,369 filed Jun. 2, 2006 which is hereby incorporated by reference in its entirety.

FIELD OF THE INVENTION

The present invention relates generally to improved techniques for the interpretation of mammogram images, and more particularly to advantageous techniques for computer automated analysis of diagnostic information from two or more different mammographic views.

BACKGROUND OF THE INVENTION

A standard mammogram consists of a set of two dimensional (2-D) x-ray images obtained in at least two different projections. The images formed using x-ray mammography are the result of differing x-ray absorption by the different tissues and structures of the body. The image formed is only two-dimensional. If multiple x-ray absorbing structures lie in the same x-ray path, information about some of these structures are likely to be obscured, distorted or both. Additionally, because mammography comprises two-dimensional imaging of a three-dimensional object, summation artifacts, that is the summation of the x-ray absorption of two or more, structures, may appear as false positive findings.

Diagnostically significant features on mammograms include, clustered microcalcifications, and masses. Because a mammogram is a two dimensional image of a three dimensional object, visual illusions can be created in the 2-D images. Specifically, objects such as micro-calcifications that are physically distant, for example, further than 1 cm apart in three dimensional space may appear to be close together because of the collapsing of the third dimension in the 2-D image. This result is visually similar to the constellation effect where stars in the sky appear to be part of a planar figure, such as the Big Dipper, but in fact, are widely separated in terms of radial distance from the Earth. Similarly, areas of the breast may appear to be radiographically dense and mass-like because of the summation of x-ray absorption by physically distinct structures in spatially separated planes perpendicular to the x-ray beam.

Physicians interpret mammograms in accordance with recommendations by the American College of Radiology, and standards specified by the Mammography Quality Standards Acts. Currently, mammographic interpretation is both subjective and qualitative. Radiologists apply judgment to identify lesions and potential lesions in a mammographic view and to determine the concordance or discordance of any such findings between mammographic views. Current methods for establishing concordance or discordance of lesions include: (a) evaluating the number of microcalcifications in each view; (b) evaluating the size of a group or groups or a cluster or clusters of microcalcifications in each view; (c) evaluating the radiographic density of lesions in each view; and (d) evaluating the shape and the uniformity of microcalcifications, masses or both in each view. These subjective and qualitative criteria are only somewhat effective in correctly establishing the concordance or discordance of candidate lesions and thus decrease the accuracy of mammography. Current methods including those described above are limited by the displacement of lesions due to the physical compression of the breast during the performance of the mammogram.

While not a replacement for the experienced radiologist, computer aided diagnosis (CAD) systems are designed to increase efficiency and reduce error. CAD software for mammography is available today. Such software typically analyzes each of the 2-D mammography views independently. While existing solutions are sensitive, in other words, they identify almost all features of diagnostic interest, they are not sufficiently specific as they too often identify false positive findings. Many false-positive findings associated with prior art approaches are constellation effect, summation artifacts, or the like, resulting from analyzing each 2-D mammogram view in isolation.

The absence of quantitative methods and automated tools for establishing the spatial concordance of a lesion or lesions between two or more mammographic or mammography views results in a higher than desired occurrence of false positive findings for both physician evaluated and computer evaluated mammography. False positive findings add significant costs to the health care system and almost always result in added stress and anxiety for the patient. False positive results can cause patients to be subjected to unnecessary follow-up testing which is costly, uncomfortable and emotionally stressful. False positive findings may result in unnecessary medical intervention, including tissue sampling, such as cytology, biopsy, or surgical excision. Furthermore, false positive CAD findings represent a potential for future litigation if the interpreting physician is not careful to adequately document his or her findings related to the CAD findings. This extra documentation reduces physician productivity and profitability. Since interpretation of mammograms requires the interpreting physician to use the breast imaging reporting and data system (BIRADS) lexicon, an incorrect BIRADS category may be assigned, resulting in an inappropriate follow-up interval, an unnecessary patient recall, or a missed or delayed diagnosis of breast cancer.

SUMMARY OF THE INVENTION

Among its several aspects, the present invention recognizes that false-positive findings associated with prior art approaches may result from the absence of the use of actual or derived points of reference from anatomic features such as the breast wall and the nipple. One aspect of the present invention relates to computer systems and methods for automated identification of diagnostically significant features, such as microcalcifications and masses, on film based or digital mammograms. Aspects of the invention include accurately determining if apparent clusters and focal densities on 2-D views are concordant or discordant in three dimensional space, specification of the location, of concordant lesions, in three dimensional space, by clock notation and distance from the nipple, and the assigning of a BIRADS classification to the mammographic or mammogram study as discussed further herein.

To such ends, the present invention comprises methods, procedures, systems, optical and magnetic media for computer automated diagnosis of screening and diagnostic mammography, especially to aid the physician in interpreting the mammogram and for application as an automated second read. Information from two mammographic or mammography views, such as cranio-caudal (CC) and medio-lateral oblique (MLO) or alternatively, cranio-caudal and medio-lateral (ML) is combined to reduce or eliminate false positive findings that result when mammographic findings, for example, microcalcifications, and focal densities, that are physically distant in three dimensional space, for example, greater than 1 cm apart, appear to be close together or mass-like in appearance, because of the collapsing of the third dimension on the 2-D image. This visual collapsing effect is analogous to the constellation effect and is known as a summation artifact, a pseudo-mass or pseudo cluster.

On aspect address a method for computer automated diagnostic evaluation of breast mammograms using information extracted from digital data from a first mammogram view of the breast and digital data from a second mammogram view of the breast, comprising the steps of: locating plural lesions within a predetermined distance for said mammogram views by analyzing said digital data from the first and second mammograms to define apparent clusters; locating the nipple in both said views; constructing a chest wall datum line in both said views; constructing a chest wall nipple datum line perpendicular to the chest wall datum line and passing through the nipple in both said views; determining a distance of a first apparent cluster from the nipple in the first mammogram view; evaluating a second apparent cluster in the second mammogram view to determine if its position relative to the nipple is within a predetermined tolerance; and labeling the first and second apparent clusters as concordant if its respective position relative to the nipple is within the predetermined tolerance.

Another aspect addresses a method for computer automated analysis of digital information from at least two different contemporaneously taken mammogram views of a breast showing the breast, nipple and chest wall, the method comprising the steps of: locating at least two common anatomical references in said at least two different mammogram views; locating at least one feature of interest for each of said mammogram views; and determining whether the position of said features is correlated utilizing said two common anatomical features.

A further aspect addresses a method for increasing the diagnostic accuracy of mammogram evaluation by using information from two mammographic views of the same breast; employing at least two anatomically-based reference points and the construction of anatomically-based datum lines; identifying radiologically significant mammographic findings in each view; locating said radiologically significant findings relative to the anatomically-based reference points and datum lines in each 2-D view independently; and employing a spatial transform method to evaluate the 3-D spatial concordance or discordance of said radiologically significant mammographic findings.

A more complete understanding of the present invention, as well as other features, aspects and advantages of the invention, will be apparent from the following detailed description, the accompanying drawings, and the claims.

DETAILED DESCRIPTION

With reference to FIGS. 1-14 which show illustrative mammography views used to illustrate aspects of the present invention and FIGS. 15A and 15B which show a process 1500 in accordance with the invention, one embodiment of the invention starts with digital data from a standard screening mammography study comprising four views, two of each breast as follows:

left cranio-caudal (LCC) and left medio-lateral oblique (LMLO); and right cranio-caudal (RCC) and night medio-lateral oblique (RMLO).

Medio-lateral (ML) views may be used instead of the MLO views. It is further noted that only two views are necessary, but where only two views are employed, they must be of the same breast. For example, left CC and left MLO views are acceptable, hut left CC and right MLO view are not an acceptable image pair.

Figure 15A:
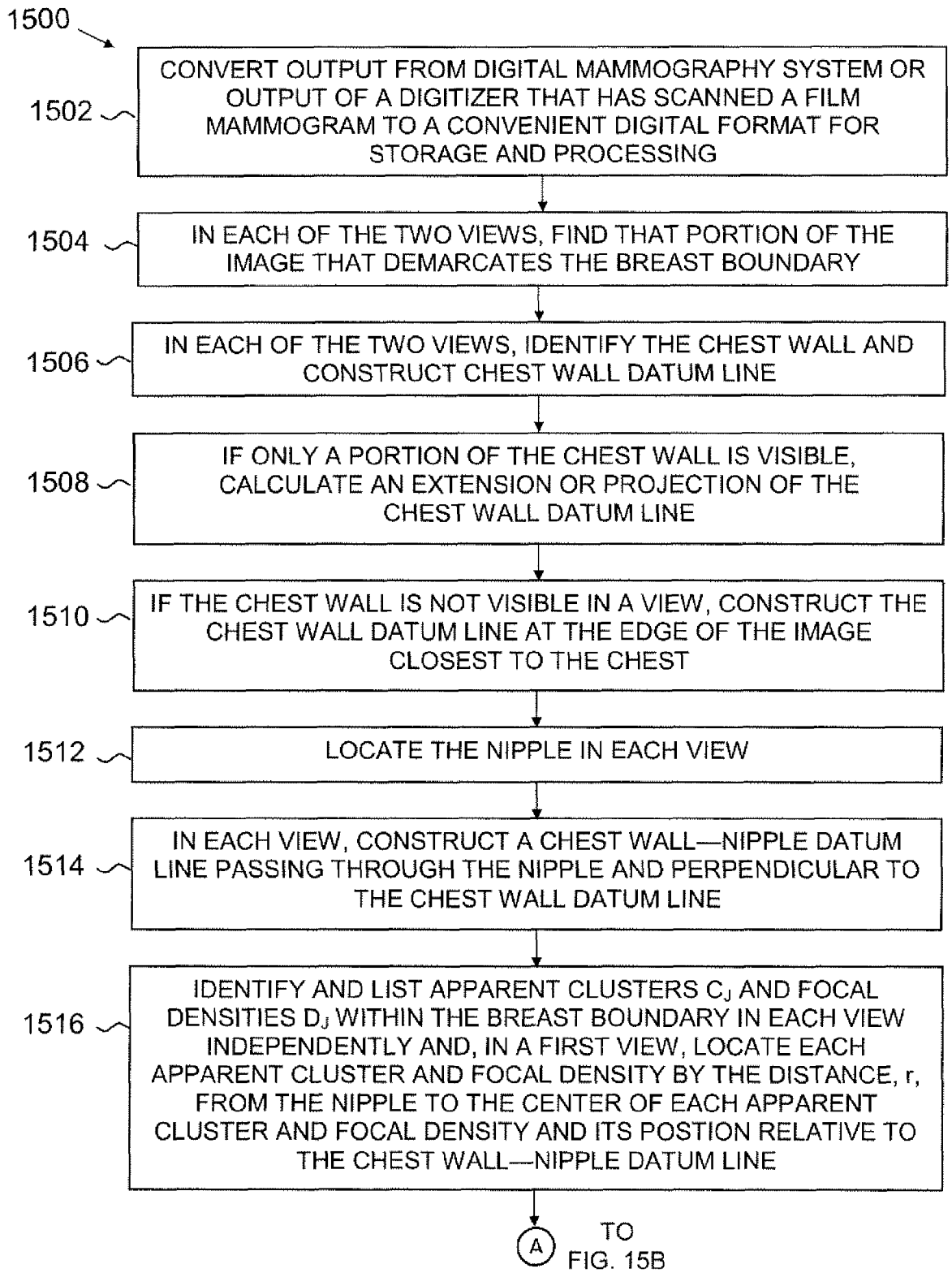
FIGS. 15A and 15B illustrate a process in accordance with the present invention.
Figure 15B:
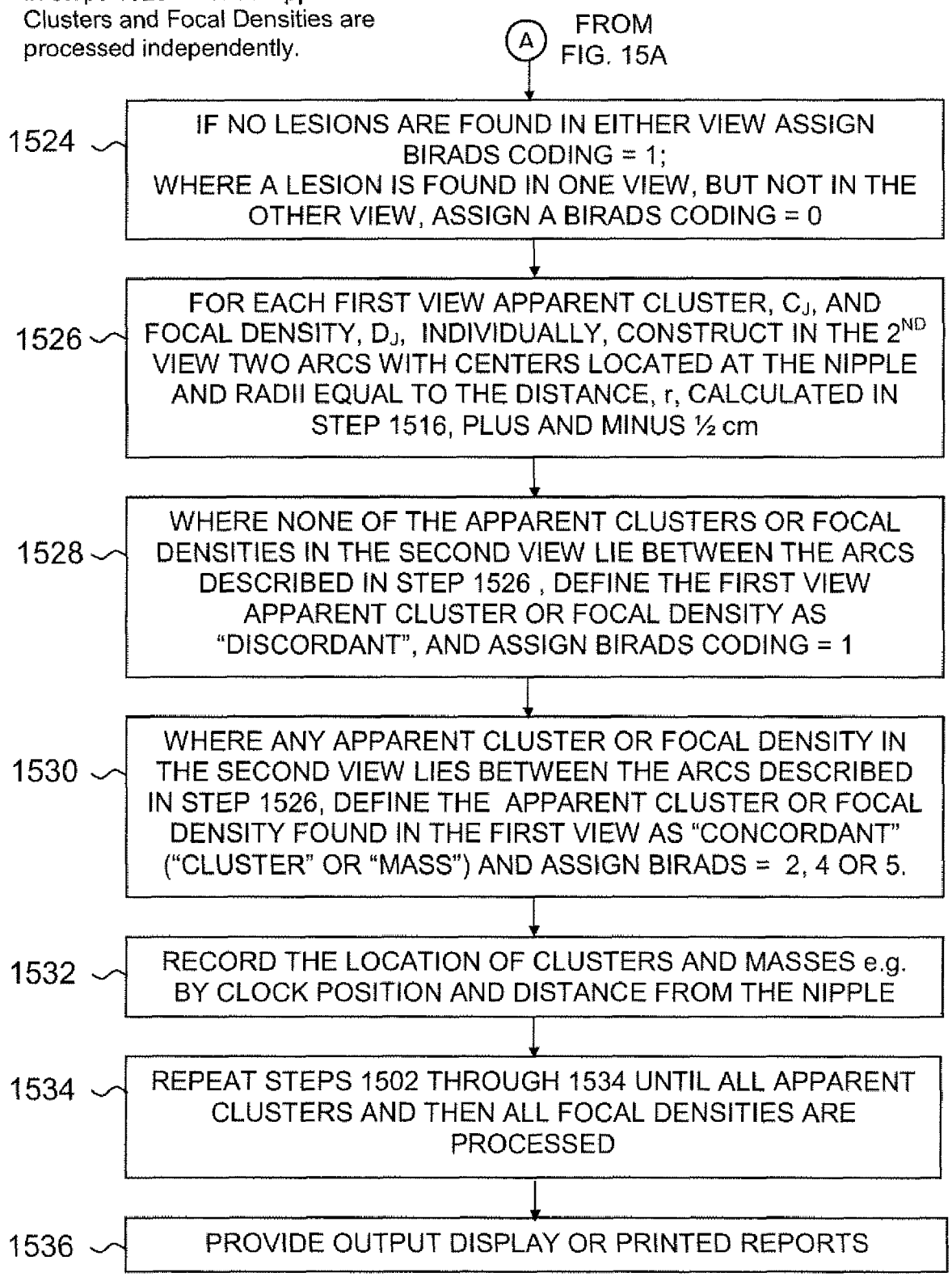

In step 1502 of process 1500 of FIG. 15A, the output of a digital mammography system, or the output of a digitizer that has scanned a film mammogram, is converted to any convenient format for storage and data processing.

Figure 1:
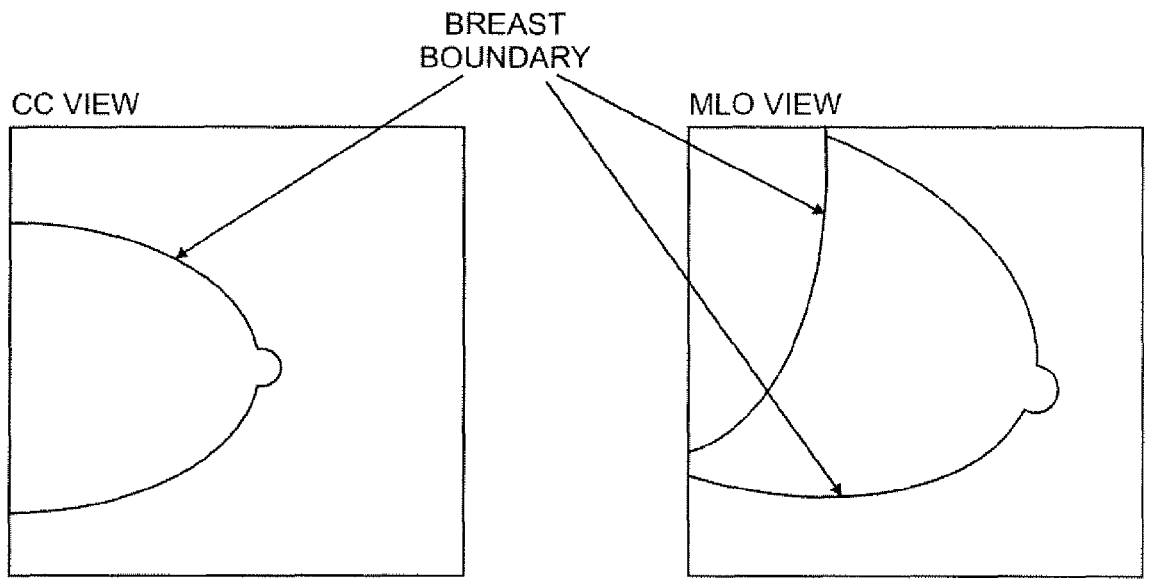
FIGS. 1-14 illustrate mammography views utilized to illustrate aspects of the present invention.
Figure 2:
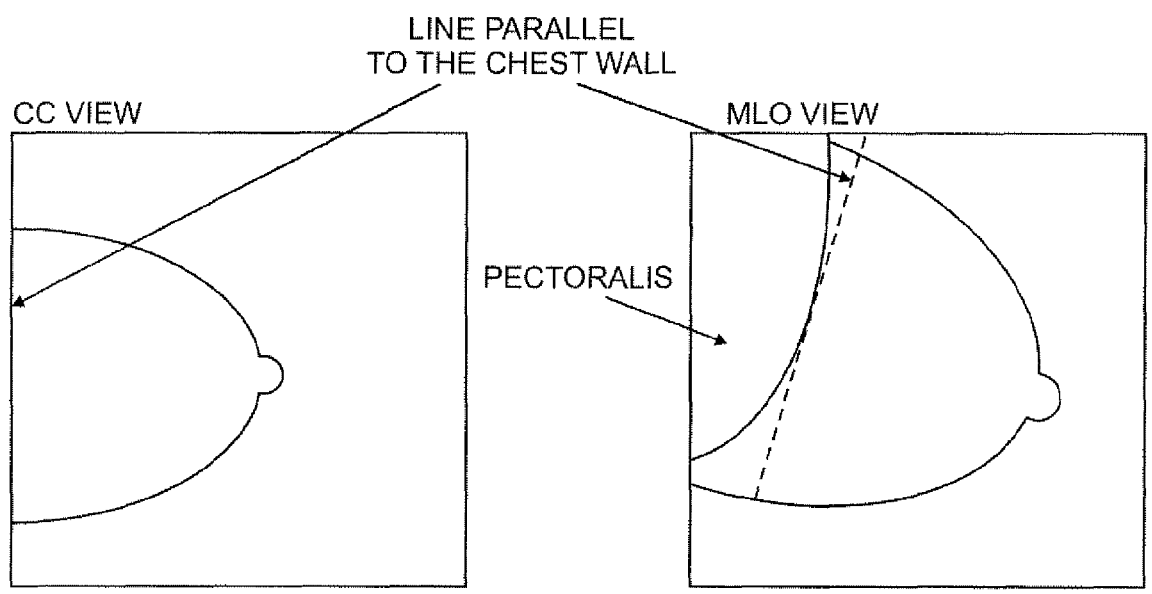
Figure 3A:
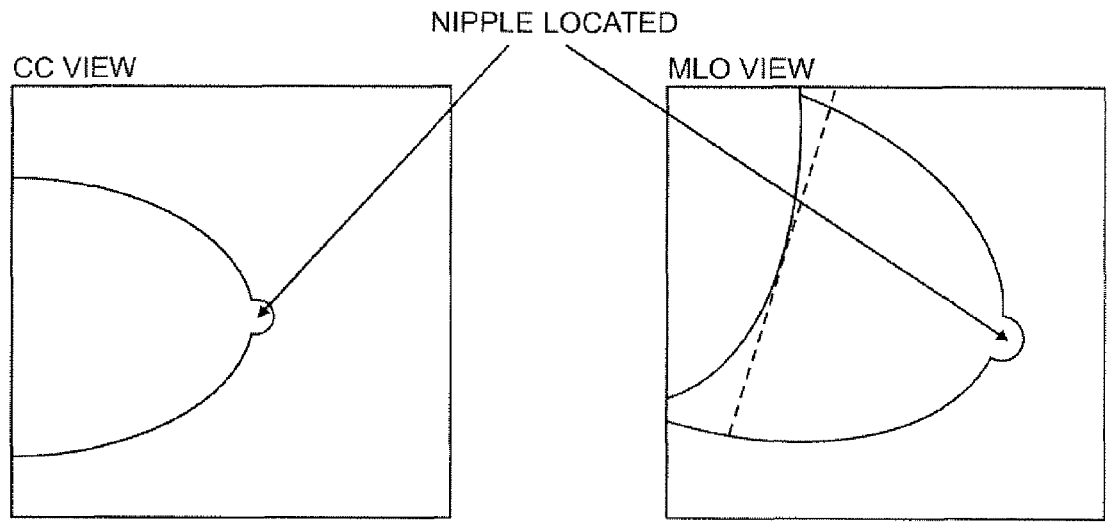
Figure 3B:
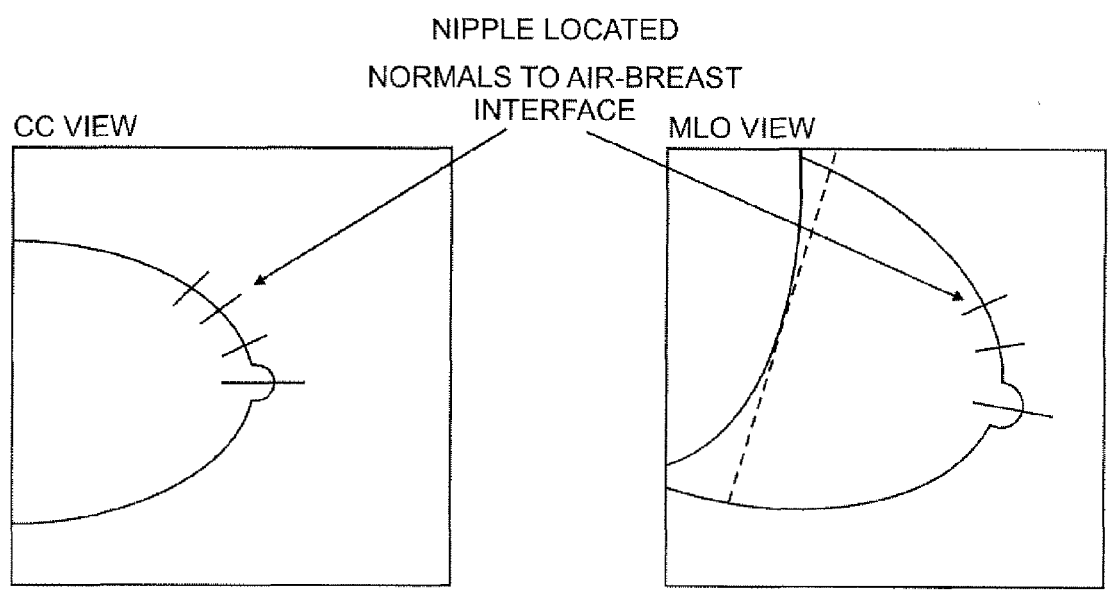
Figure 4:
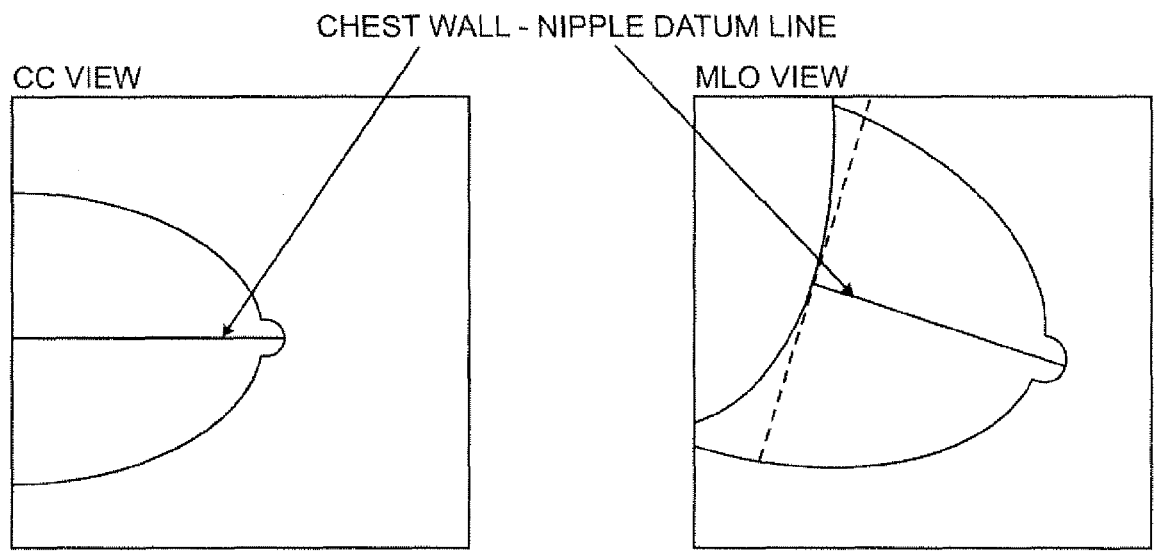
Figure 5:
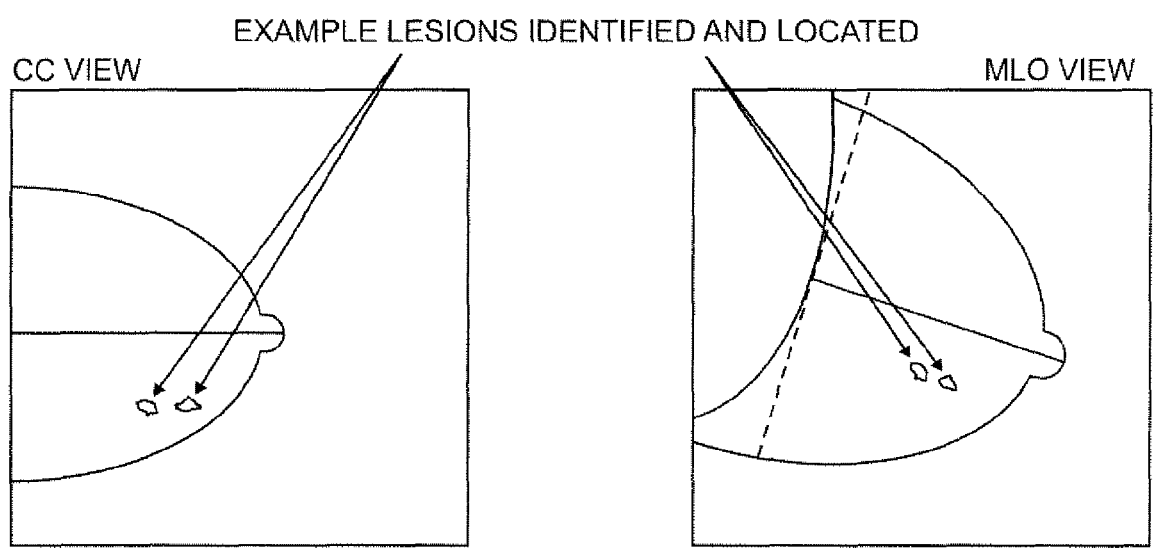

On each pair of views of the same breast, for example, LCC and LMLO, or RCC and RMLO, the following steps are performed. It is noted that in FIGS. 1-14, the left views are CC views and the right views are MLO views respectively. Referring to FIG. 1, that portion of the image that represents the breast boundary is found in step 1504. In other words, the breast is identified versus chest wall, background, and the like. Referring to FIG. 2, the chest wall is identified, and a reference datum line is constructed parallel to the chest wall in step 1506. If only a portion of the chest wall is visible on the view, as is the case with MLO views, an extension or projection of the chest wall line is calculated in step 1508. If the chest wall is not visible in the CC or ML views, the datum line is constructed at the edge of the image closest to the chest in step 1510, as the datum line will be parallel to the chest wall. Referring to FIGS. 3A and 3B, the nipple is located in step 1512. Referring to FIG. 4, a reference datum line is constructed through the nipple, perpendicular to the chest wall datum line in step 1514.

Figure 6A:
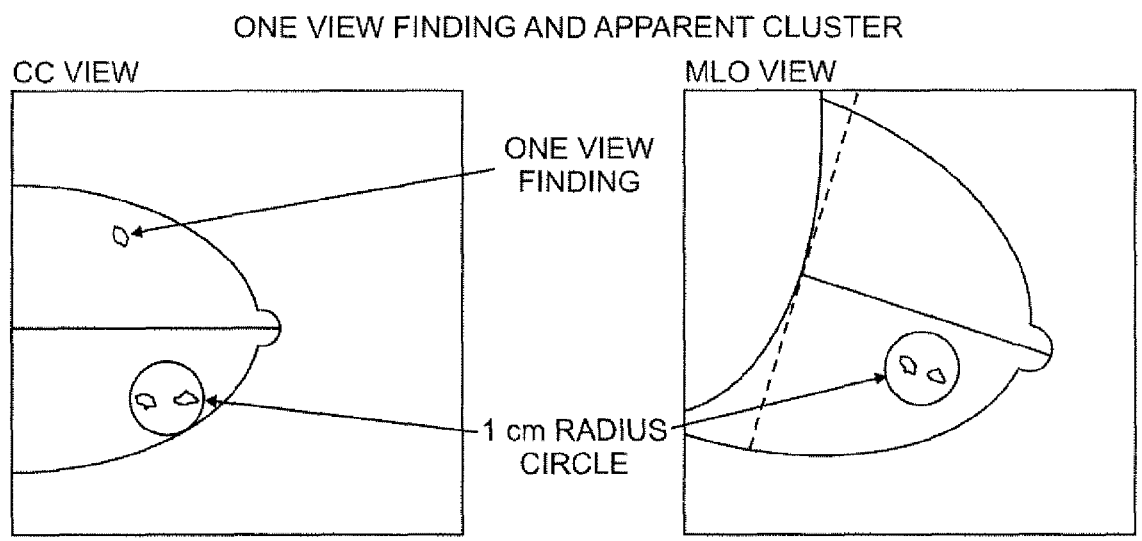
Figure 6B:
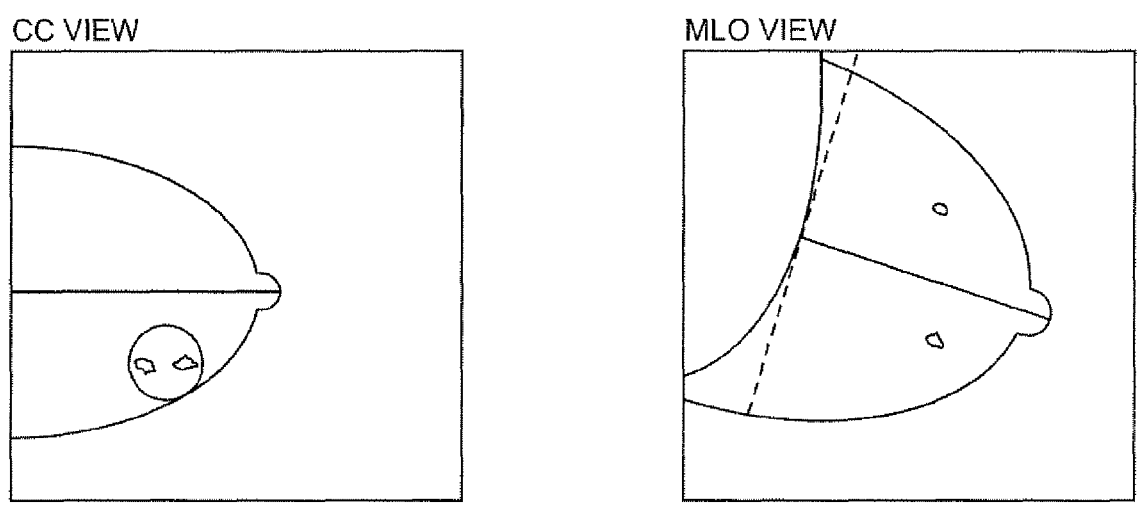

Radiologically significant findings, such as apparent clusters and focal densities sometimes referred to herein by the shorthand term lesions, are identified, located by distance from the nipple and position above or below the chest wall nipple datum line, and placed into a list for further processing in step 1516. In the example shown in FIG. 5, the lesion sizes are exaggerated for purposes of ease of illustration. Apparent clusters and focal densities are identified in each view independently. It is noted that using only one 2-D view it is not possible to discern if the apparent cluster is a true cluster lying within a 1 cm sphere or a constellation artifact. FIG. 6A depicts apparent clusters while FIG. 6B depicts a constellation artifact.

The location of an apparent cluster is the geometric center of all microcalcifications comprising the apparent cluster, independent of the size of the member microcalcifications. The location of a focal density is specified by the location of its center, calculated as the modal radius from the detectable borders.

Figure 7A:
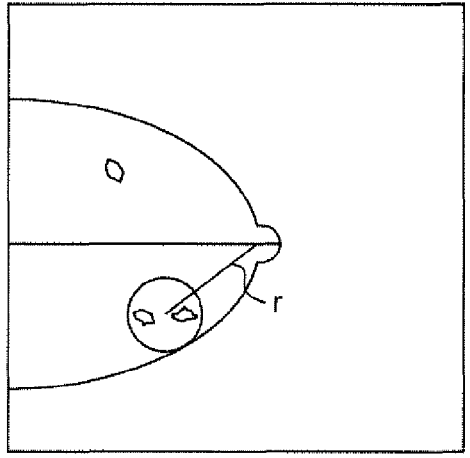
Figure 7A:
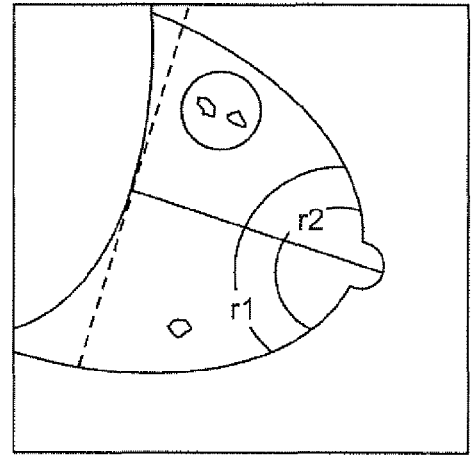
Figure 7B:
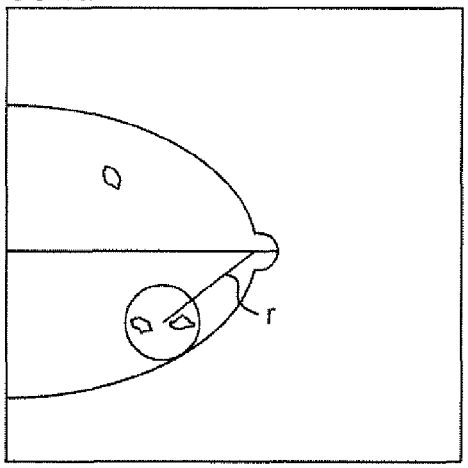
Figure 7B:
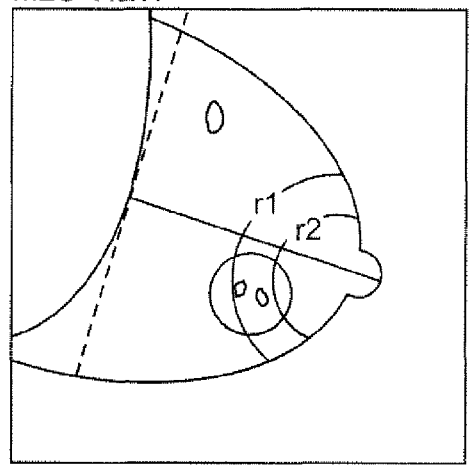

Apparent clusters and focal densities, are located relative to the nipple, for example, by using polar coordinates in step 1516. Referring to FIG. 7A, using the CC view, the distance from the nipple is calculated to the center of each apparent cluster found in step 1516. Referring to FIG. 7B, using the MLO view, it is determined in step 1526 if the center of any apparent cluster in the MLO view lies between two arcs whose center is at the nipple and whose radii, $r_1$ and $r_2$, are equal to the value r calculated in step 1516, plus and minus ½ cm, respectively. In other words, $r_1=r+½$ cm and $r_2=r-½$ cm.

The case where a lesion is found in one view, for example, CC, but no lesion is found in the other view, for example, MLO, of the same breast, is defined as a one view finding in step 1524. A one view finding will be assigned a BIRADS=0 and, if confirmed by the radiologist, will require the patient to have additional studies, for example, additional mammography views. The CC view of FIG. 6A depicts a one view finding.

If there is an apparent cluster in the CC view, and an apparent cluster in the MLO view, but the center of the apparent cluster in the MLO view does not lie between the arcs described in step 1526, the apparent cluster found in the CC view is defined as discordant in step 1528. FIG. 7A depicts discordant clusters. If there is an apparent cluster in the CC view, and at least one apparent cluster in the MLO view and the center of at least one apparent cluster in the MLO view lies between the arcs described in step 1524, the apparent cluster found in the CC view is defined as concordant in step 1530. FIG. 7B depicts concordant clusters.

Discordant clusters are false positives and are assigned BLRADS=2. Concordant clusters are true positive findings and are assigned BIRADS=2, 4 or 5 as determined by the exemplary microcalcification analysis process 2000 of FIG. 20 and the exemplary mass analysis process 2100 of FIG. 21. The locations of all concordant clusters are indicated by two descriptors, clock position and distance from the nipple in step 1532.

Figure 23:
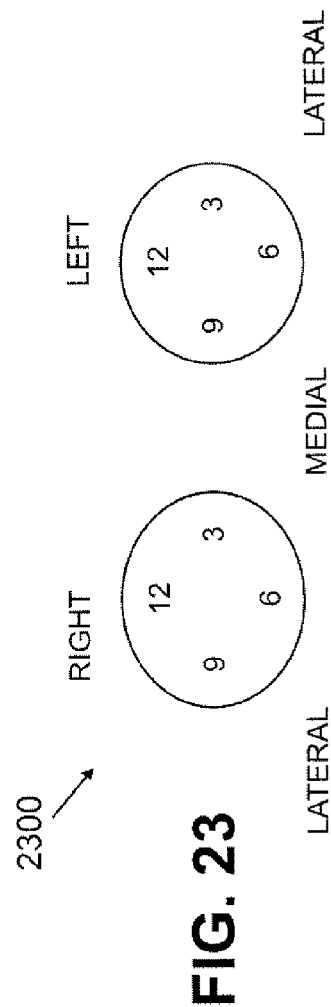
FIG. 23 illustrates aspects of use of a clock diagram in accordance with the present invention.

With reference to FIG. 23, clock position as used herein describes the angular position of lesions in a clock diagram, such as clock diagram 2300 of FIG. 23. Visualize curved lines from the nipple to the chest wall at clock positions. The clock positions 10, 11, 12, 1, and 2 define an upper hemisphere, and clock positions 4, 5, 6, 7, and 8 define a lower hemisphere. The clock positions 3 and 9 describe a finding equidistant from the superior and inferior edges of the right or left breast. Clock positions 7, 8, 9, 10, and 11 define a lateral finding in the right breast or a medial finding in the left breast. The clock positions 1, 2, 3, 4, and 5 define a medial finding in the right breast or a lateral finding in the left breast. The clock positions 12 and 6 define a finding equidistant from the medial and lateral edges of the right or left breast. A clock position of "0" specifies only the distance from the nipple to the finding and defines a finding located directly behind the nipple, along or near the chest wall nipple datum line. Distance from the nipple is the straight line distance measured from the nipple to each lesion. An output display or printed report is provided to the user in step 1536.

One technique is described below for estimating the clock position of concordant clusters or masses in mammograms. In this approach, it is assumed that the coordinates of concordant clusters or masses have been previously calculated in both the CC and MLO views.

In making these calculations, it is noted that a transformation between image coordinates and world coordinates is involved. The world coordinates are as viewed by the physician, with the nipple at the origin. The xy plane is therefore approximately parallel to the chest wall, with x horizontal, positive on the patient's left, and y vertical. The use of the term horizontal here assumes the patient is standing.

A coordinate system is defined as follows: positive y vertical in the CC view is positive x in the world coordinates system. Therefore, the offset from the nipple, in the x direction is $x=y_{Ccc}-y_{Ncc}$ where $y_{Ccc}$ denotes the y coordinate, in the CC image of the lesion and $y_{Ncc}$ denotes the y coordinate in the CC image of the nipple. In the y direction, the offset is $y=y_{Nml}-y_{Cml}$ where $y_{Nml}$ denotes the y coordinate in the MLO image of the nipple, and $y_{Cml}$ denotes the y coordinate, in the MLO image of the lesion.

From these two measurements, the projection of the lesion or cluster center onto the xy plane is computed, and from that computation, the rotation angle, $\theta=\tan^{-1}$ (y/x) is determined. The angle returned by the arctangent is normally in radians and must be converted and scaled to lie between the clock positions 0 and 12. Furthermore, a clock has zero vertical rather than following the usual notation for angles which is with reference to the x axis. This conversion is accomplished by $$\Gamma = 3 - \frac{12}{2\pi}\theta,$$

where $\Gamma$ is the clock coordinate. This result is normally reported as an integer and no attempt is typically made to report with more precision than the nearest hour, as it is recognized that nearest hour resolution is sufficient to communicate the anatomic location of a mass or a cluster of micro-calcifications. It will be recognized that positions to the nearest 30 minutes, 15 minutes or the like could be calculated.

Figure 24:
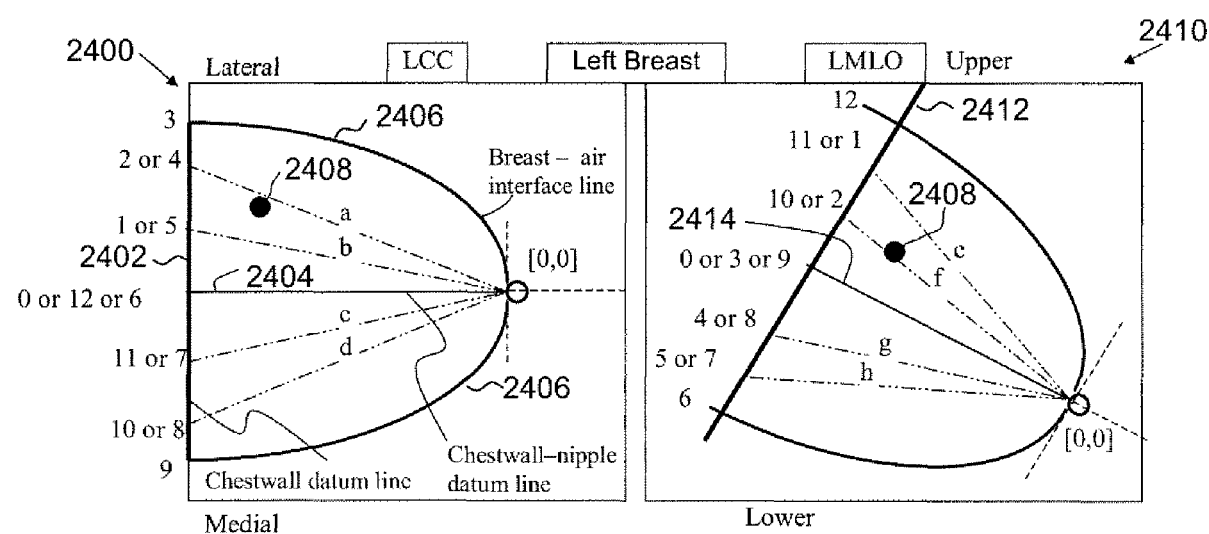
FIG. 24 illustrates an alternative clock diagram approach in accordance with the present invention.

FIG. 24 illustrates an alternative approach to determining clock position in accordance with the invention. FIG. 24 illustrates CC and MLO views 2400 and 2410, respectively, of a left breast. In FIG. 24, the nipple is assigned the coordinate (0,0). A chest wall datum line 2402 and 2412, respectively, is identified in each view. Each chest wall datum line is divided in six equal segments. In the CC view 2400, lines a, b, c and d are constructed from the nipple to the chest wall datum line 2402 dividers. Clock positions {3}, {2 or 4}, {1 or 5}, {0 or 12 or 6}, {11 or 7}, {10 or 8} and {9} are assigned as shown. In the MLO view 2410, lines e, f, g and h are constructed to the chest wall datum line 2412 dividers. Clock positions {12}, {11 or 1}, {10 or 2}, {0 or 3 or 9}, {4 or 8}, {5 or 7}, and {6} are assigned as shown. In each view, a chest wall nipple datum line 2404 and 2414, respectively, is constructed. Using the CC view 2400, it is determined which line a, b, c, d, chest wall nipple datum line 2404, or breast air boundary 2406 is closest to an apparent cluster or local density 2408. In the example shown, line a corresponding to clock position {2 or 4} is closest.

Using the MLO view 2410, the line closest to the an apparent cluster or local density 2408 and having a clock position in common with the line selected in the CC view above is identified. In the example shown, line f corresponding to clock positions {0 or 2} is closest and the an apparent cluster or local density is assigned the common position of 2 o'clock. The distance from the an apparent cluster or local density 2408 to the nipple is calculated, preferably using the MLO view 2410. Finally, the location of concordant radiologically significant findings, such as clusters or masses is output as the clock position and distance from the nipple.

Figure 8:
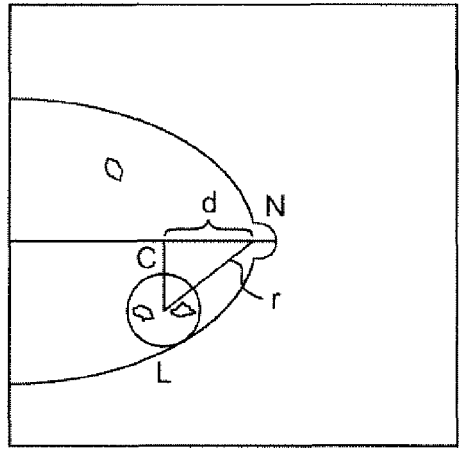
Figure 8:
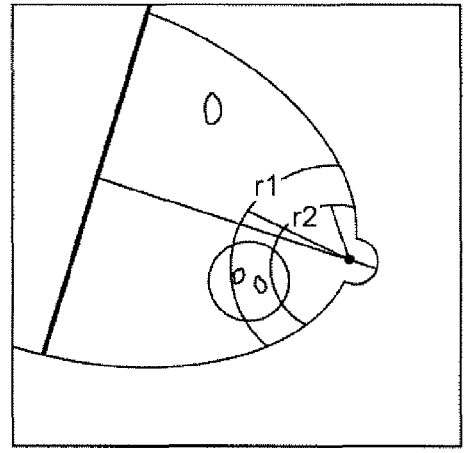
Figure 16:
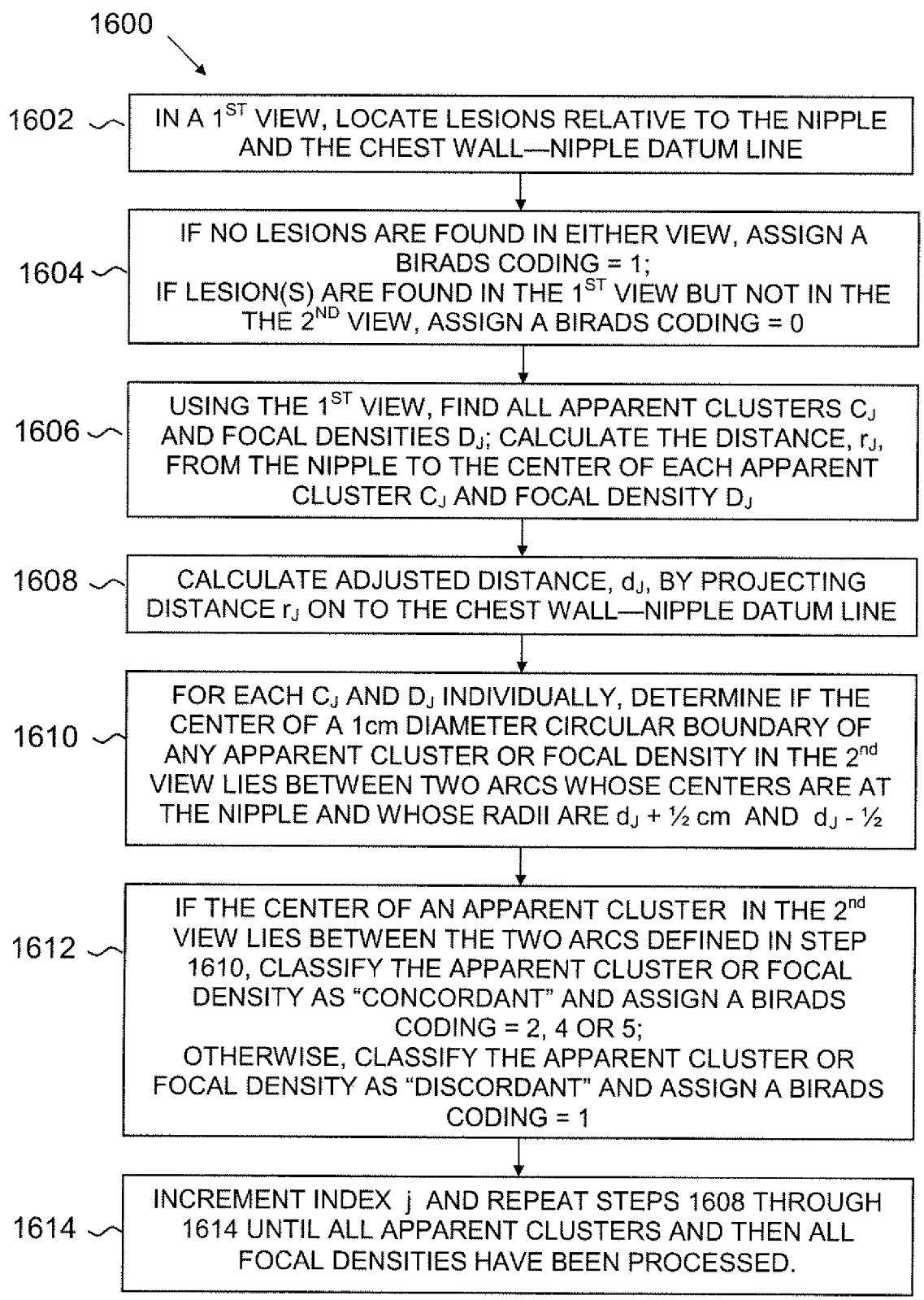
FIGS. 16-18 illustrate aspects of further processes in accordance with the present invention.

A further embodiment of the present invention is based upon an adjusted distance search process 1600 shown in FIG. 16. With reference to FIG. 8, lesions, are located relative to the nipple in steps 1604 and 1606. Using the CC view, apparent clusters and focal densities are found and placed in a list. The distance from the nipple to the center of each apparent cluster and focal density is calculated in step 1606. For each apparent cluster or local density, in step 1608, an adjusted distance, d', is calculated by multiplying the distance from the nipple to the apparent cluster or focal density and the cosine of the angle, CNL, formed between the nipple to apparent cluster vector (or the nipple to focal density vector) and the chest wall to nipple datum line as seen in FIG. 8. Next, it is determined in step 1610, if the center of any apparent clusters (or focal densities, when processing focal densities) on the MLO view lie between two arcs whose center is at the nipple and whose radii, $r'_1$ and $r'_2$, are equal to the value d' calculated in step 1608, plus and minus ½ cm, respectively. In other words, $r'_1 = d' + ½$ cm, and $r'_2 = d' - ½$ cm. In step 1610, if the center of an apparent cluster (focal density) is within the two arcs, the apparent cluster (focal density) found in the CC view is classified as concordant and assigned BIRADS=2, 4 or 5 per the microcalcification analysis process 2000 of FIG. 20 and the mass analysis process 2100 of FIG. 21.

Figure 9:
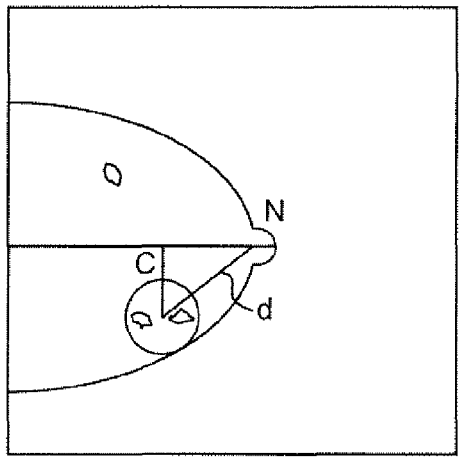
Figure 9:
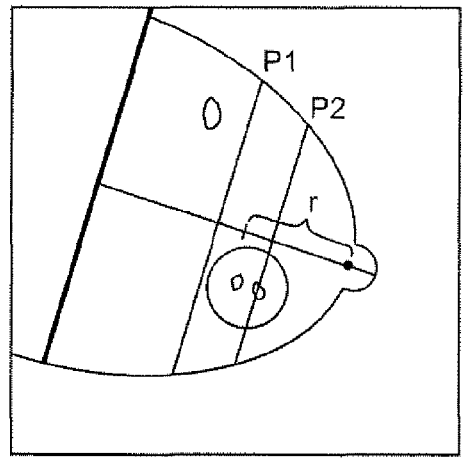
Figure 17:
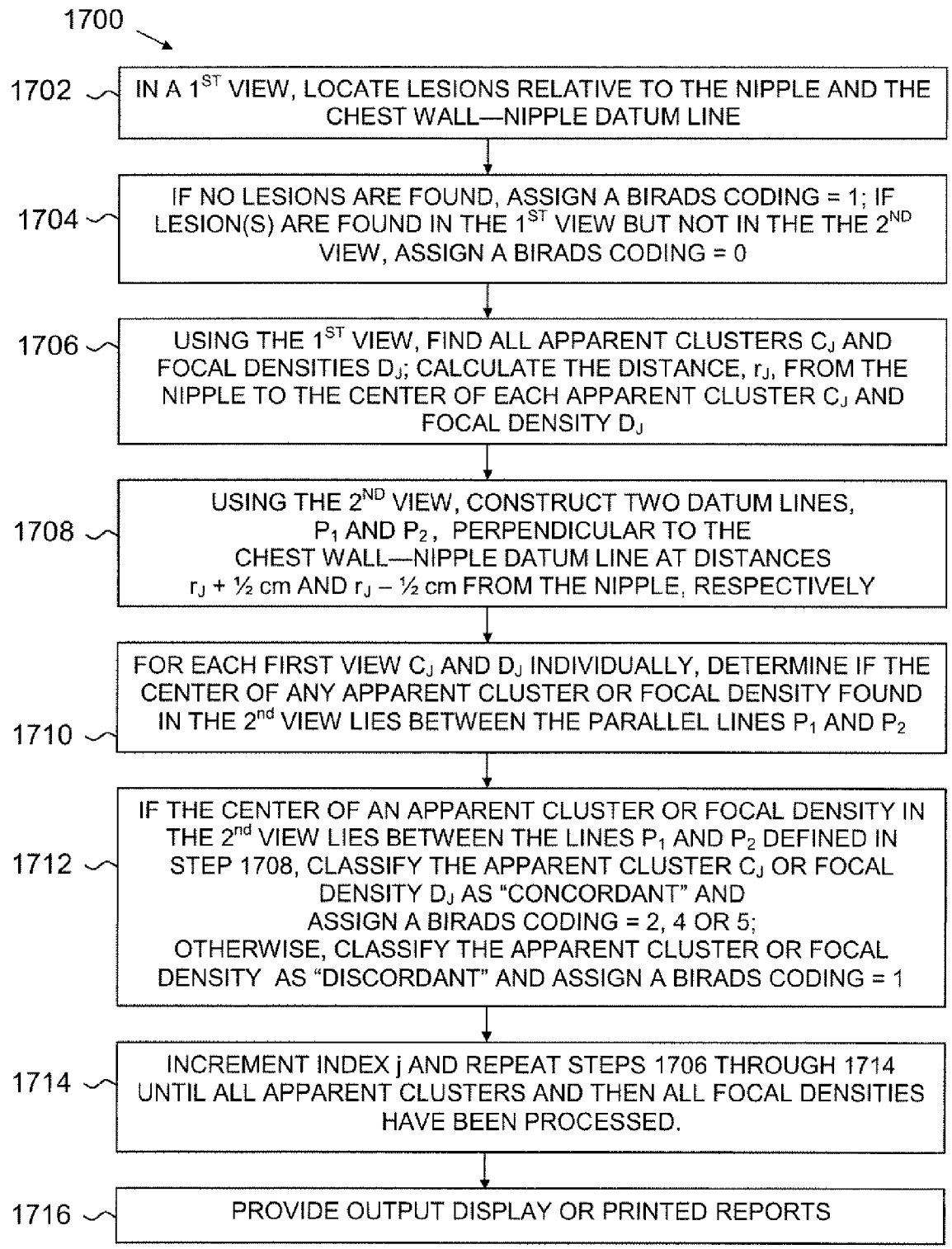

Referring to FIG. 9, a perpendicular search process 1700 shown in FIG. 17 may suitably be employed as follows. Lesions are located relative to the nipple in step 1702. Using the CC view, the distance, d, is calculated from the nipple to the center of each lesion in step 1704. The distance d is measured from the nipple along the nipple-to-chest wall datum line. A new datum line is constructed perpendicular to the chest wall-to-nipple datum at the distance d from the nipple in step 1704. Two additional data lines, $P_1$ and $P_2$, are constructed in step 1708 parallel to the line constructed in step 1706, at a distance d+½ cm and d-½ cm as seen in FIG. 9.

In step 1710, if the center of any lesion on the MLO view lies between the parallel lines $P_1$ and $P_2$, the lesion is classified as concordant. Otherwise, it is classified as discordant. Concordant lesions are assigned BIRADS=2, 4 or 5. Discordant lesions are assigned BI-RADS=2.

Figure 10:
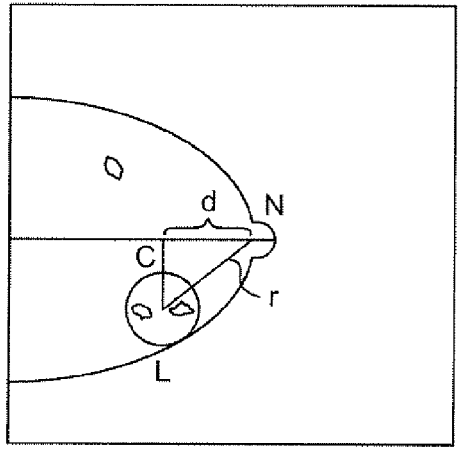
Figure 10:
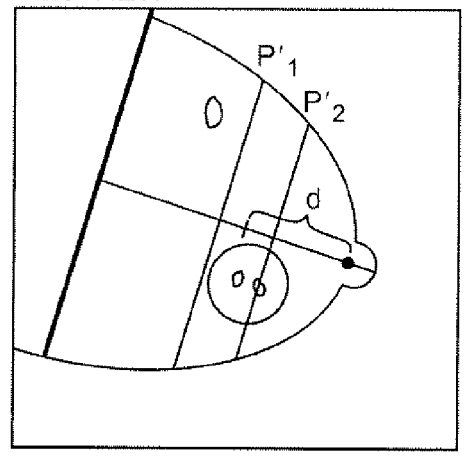
Figure 11:
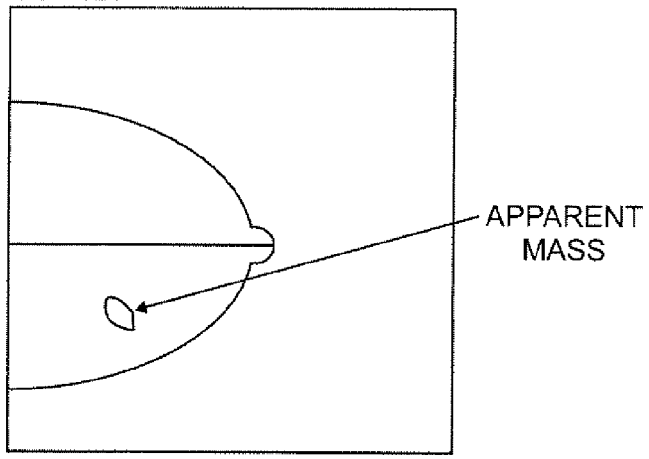
Figure 11:
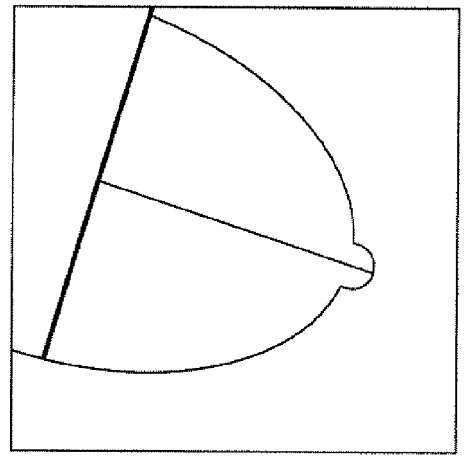
Figure 12:
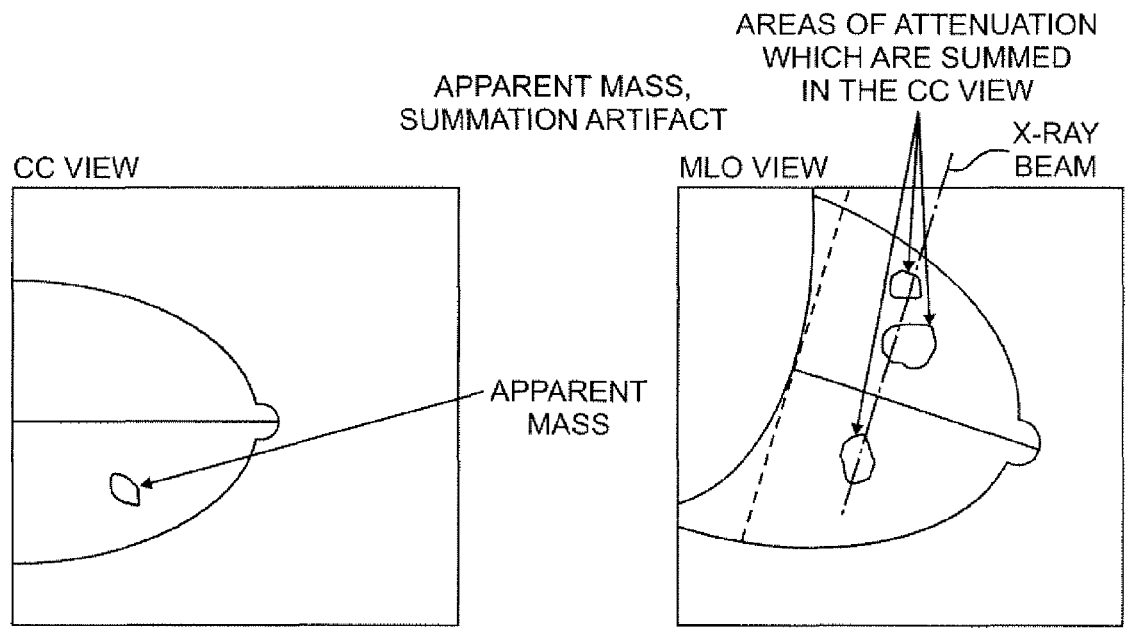
Figure 13:
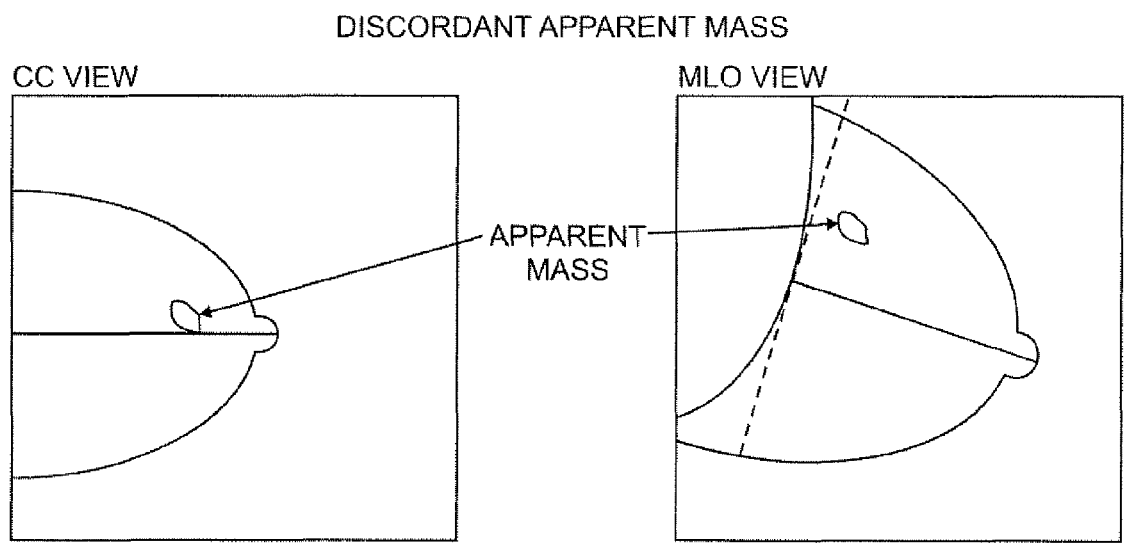
Figure 14A:
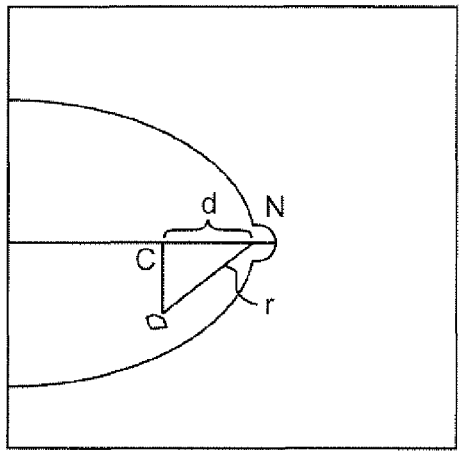
Figure 14A:
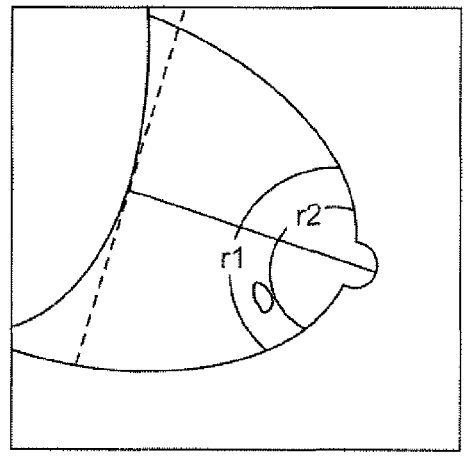
Figure 14B:
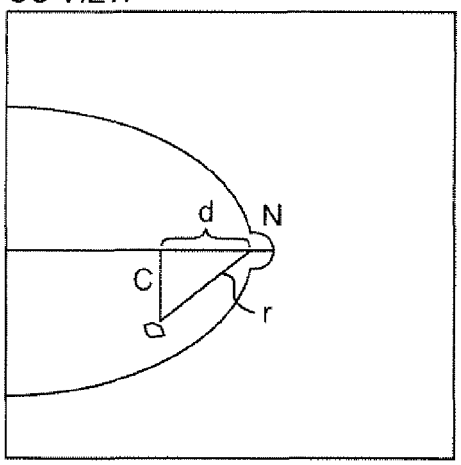
Figure 14B:
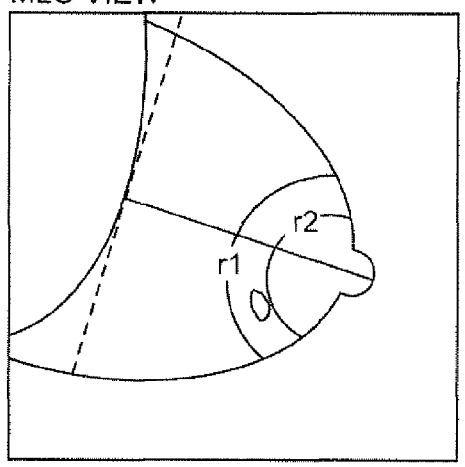
Figure 14C:
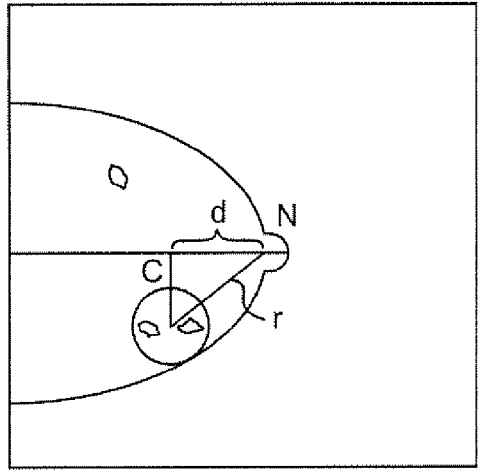
Figure 14C:
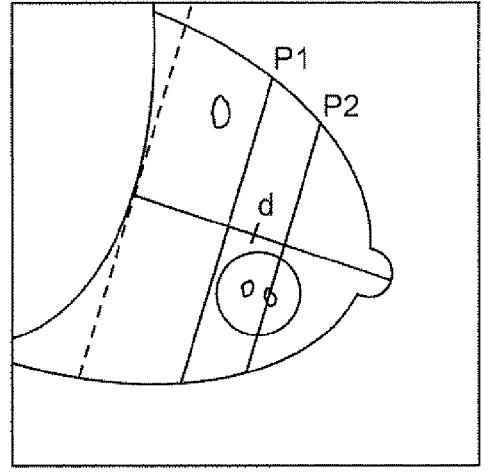
Figure 18:
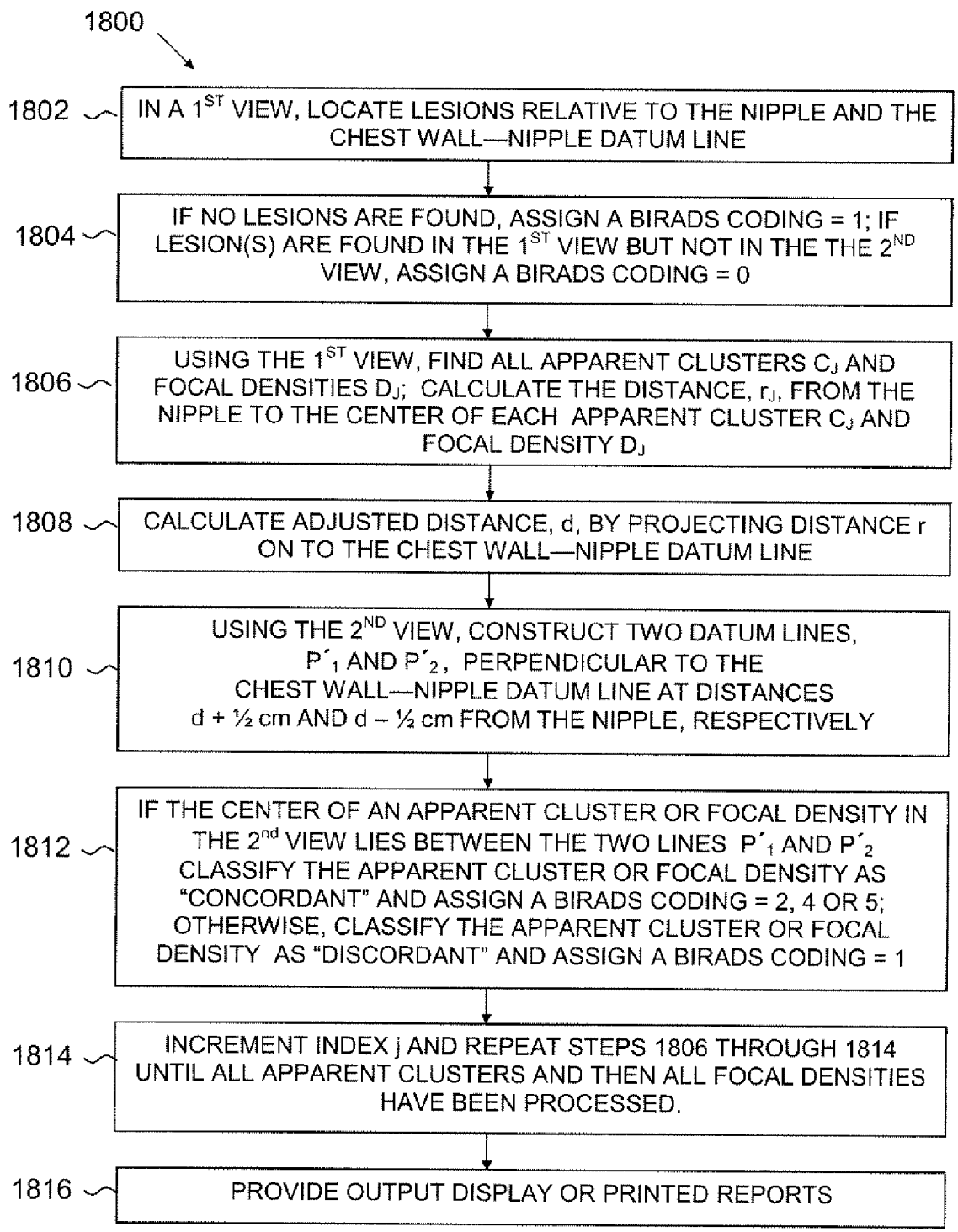

A projected perpendicular search process 1800 shown in FIG. 18 is discussed below with reference to FIG. 10. In step 1802, lesions are located relative to the nipple. Using the CC view, distance, d, is calculated from the nipple to the center of each lesion in step 1804. For each lesion, an adjusted distance, d', is calculated in step 1806 by multiplying the distance from the nipple to the lesion and the cosine of the angle, CNL, formed between the nipple-to-lesion vector and the chest wall-to-nipple datum line as seen in FIG. 10. The distance d' is measured along the nipple-to-chest d' wall datum line. In step 1808, a new datum line is constructed perpendicular to the chest wall-to-nipple datum at the distance d' from the nipple. Two additional data lines, $P'_1$ and $P'_2$, are constructed in step 1810 parallel to the line constructed in step 1808, at a distance d'+½ cm and d'-½ cm. If the center of any lesion on the MLO view lies between the parallel lines $P'_1$ and $P'_2$, the lesion is classified as concordant in step 1812. Otherwise, it is classified as discordant. Concordant lesions are assigned BIRADS=2, 4 or 5. Discordant lesions are assigned BIRADS=2.

A further embodiment of the present invention is based upon a three dimensional (3-D) adjusted distance search process 1600. Lesions are located relative to the nipple in step 1602. Using the CC view and the MLO view or alternately the ML view, the distance from the nipple to the center of each lesion is calculated in step 1604. For each lesion, in step 1606 an adjusted distance, d", is determined as the distance in 3-space from the nipple to the center of the lesion. The distance d" may be calculated, for example, as the square root of the sum of the squares of x", y" and z" where for each lesion, x" is the distance measured from N to C in the CC view, or calculated by multiplying the distance from the nipple to the lesion and the cosine of the horizontal angle, CNL, formed between the nipple-to-lesion vector and the chest wall-to-nipple datum in the CC view; y" is the distance measured from C to L in the CC view, or by multiplying the distance from the nipple to the lesion and the sine of the horizontal angle, CNL, formed between the nipple-to-lesion vector and the chest wall-to-nipple datum in the CC view; and z" is the distance measured from C to L in the MLO or ML view or calculated by multiplying the distance from the nipple to the lesion and the sine of the vertical angle, CNL, formed between the nipple-to-lesion vector and the chest wall-to-nipple datum in the MLO or ML view.

The present invention may be suitably implemented as a computer-based system, in computer software which resides on computer readable media, such as solid state storage devices, such as RAM, ROM, FLASH RAM, or the like, magnetic storage devices such as a hard disk or floppy disk media, optical storage devices, such as CD-ROM, DVD, or the like, or as methods implemented by such systems and software.

Figure 19:
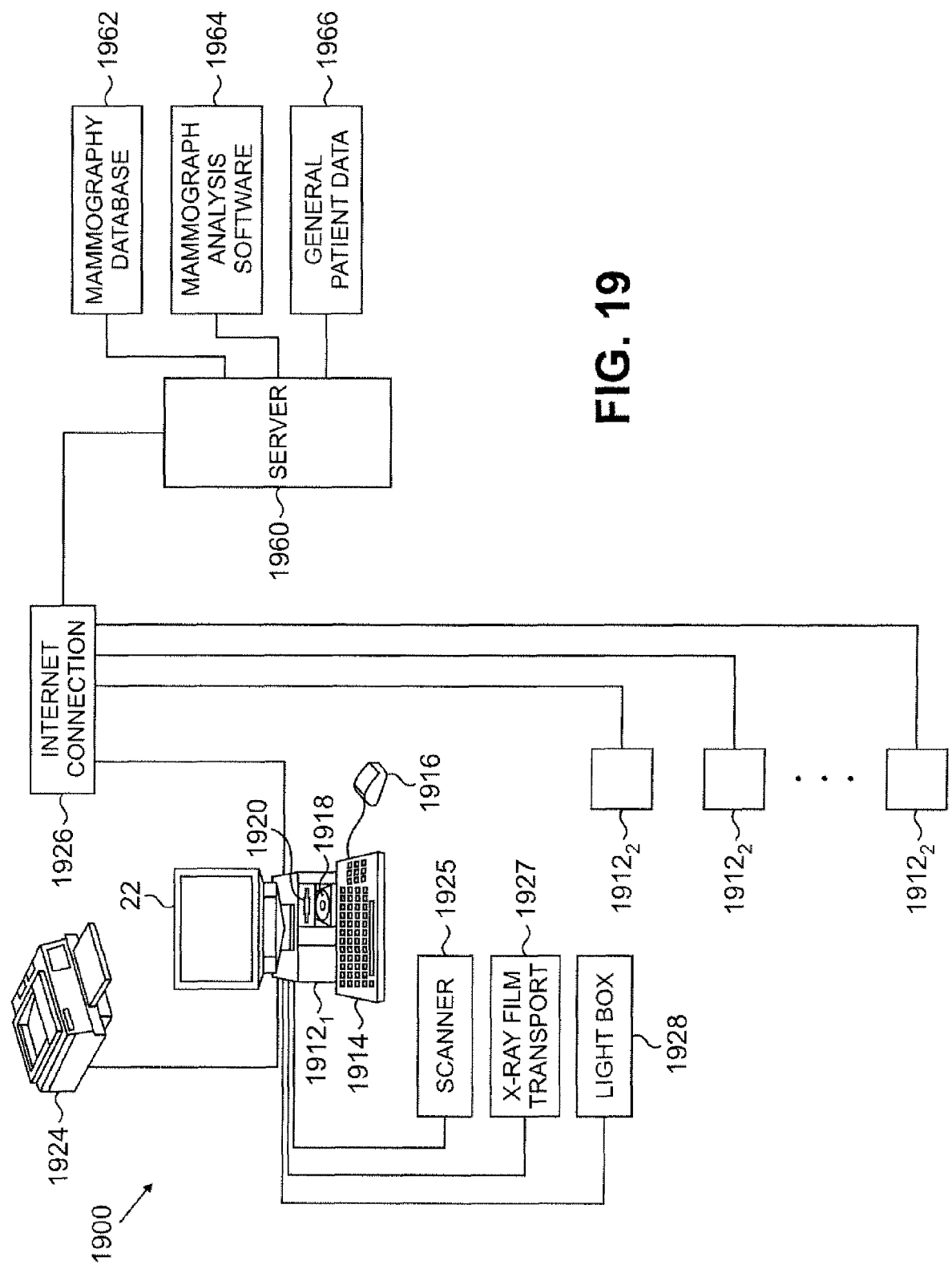
FIG. 19 illustrates aspects of a system embodiment of the present invention.

FIG. 19 shows an exemplary block diagram of a system 1900 which may be suitably used to implement the present invention. System 1900 is implemented as a plurality of user computers $1912_1$ ... $1912_n$ (collectively 1912) such as a personal computer, workstation, or server. One likely scenario is that the system of the invention will be implemented as a personal computer or workstation which connects to a server or other computer running software to implement the processes of the present invention either through a network, Internet or other connection. As shown in FIG. 19 and described in further detail below, the system 1900 includes software that is run by the central processing unit of each computer 1912, as well as server 1960.

Each computer 1912 may suitably include a number of standard input and output devices, including a keyboard 1914, a mouse 1916, one or more optical disk drives 1918, such as a CD-ROM, DVD or the like, magnetic disk drive 1920, monitor 1922, and printer 1924. In addition, each computer 1912 may suitably include a scanner 1925 for scanning and digitizing a mammographic film, or some other input mechanism for digital mammography data, an Internet or network connection 1926 for downloading software, data, such as patient data, training data, or the like and updates, or for providing outputs to remote system users, such as medical colleagues called in for a consult, or a patient's general practitioner with whom test results are to be shared, for example. Additionally, an x-ray film transport device 1927 and a light box device 1928, will likely be employed and controlled by the computer 1912. For example, a physician will use computer 1912 to control the x-ray film transport device 1927 so that the x-ray films corresponding to the case being analyzed by the software controlled system are displayed on the light box 1928 for the physician's review.

It will be appreciated, in light of the present description of the invention, that the present invention may be practiced in any of a number of different computing environments without departing from the spirit of the invention. For example, the system 1900 may be implemented in a network configuration with individual workstations connected to a server. Also, other input and output devices may be used, as desired. For example, a remote user could access the server with a desktop computer, a laptop utilizing the Internet or with a wireless handheld device such as a Blackberry™ Treo™, or the like.

As illustrated in FIG. 19, additional inputs to server 1960 may suitably include a mammography database 1962 with historical patient data, mammographic analysis software 1964, and a general patient database 1966, by way of example.

It is anticipated that one embodiment of the present disclosure will be implemented in software. The software may be stored in any appropriate computer readable medium, such as RMA. The software may be executed on any appropriate computer system, such as the system 1912 as shown in FIG. 19, and that this system and software will implement the above described processes, as well as, the further process details specifically discussed below in connection with the discussion of FIGS. 20-23.

Figure 20:
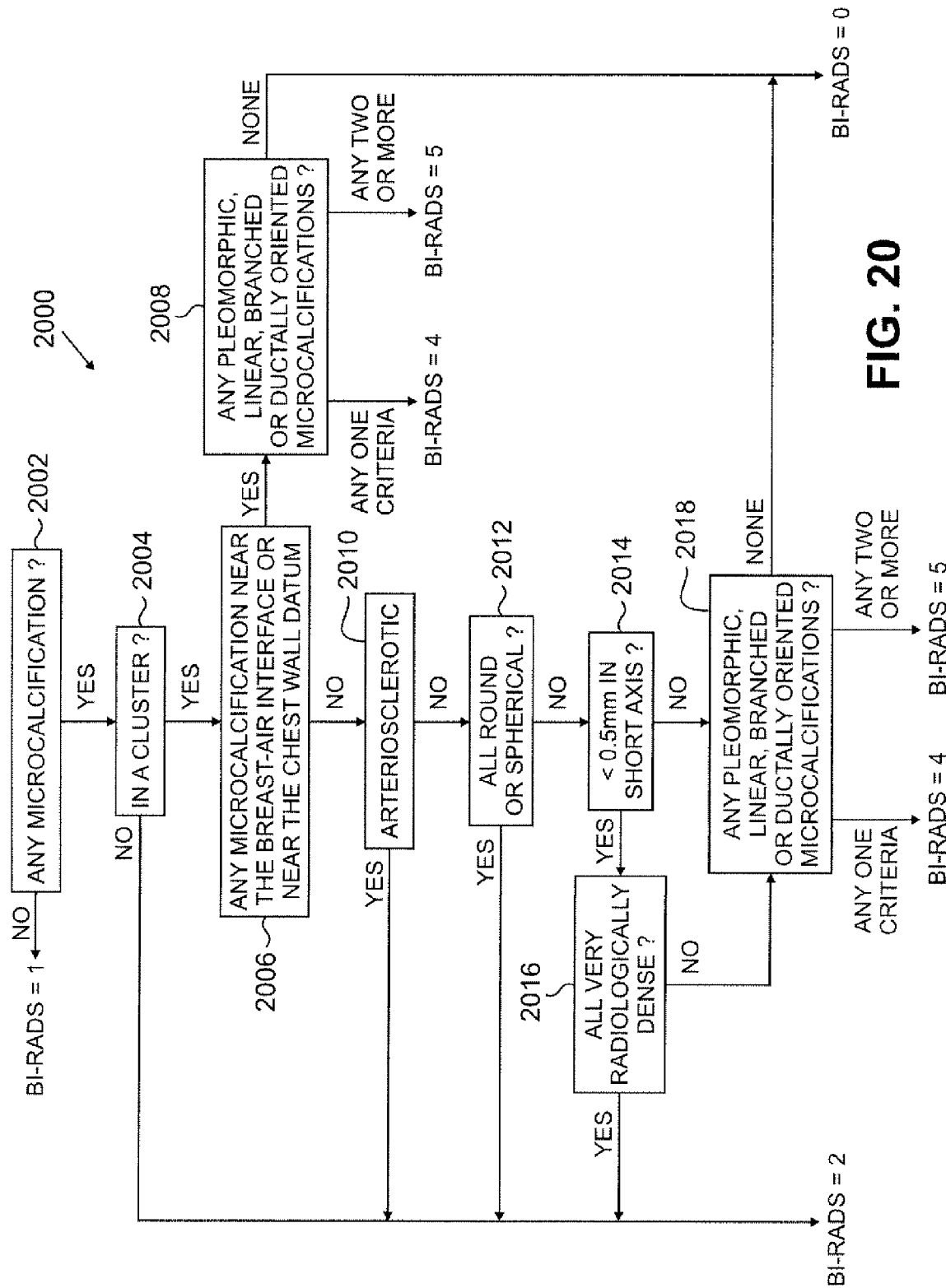
FIGS. 20-22 illustrate aspects of further processes in accordance with the present invention.

FIG. 20 illustrates a microcalcification analysis process 2000 in accordance with the present invention. In step 2002, it is determined whether any microcalcifications have been identified. If no, a BI-RADS=1 is assigned in the absence of other diagnostic findings. If yes, the process 2000 continues with step 2004 in which it is determined that a microcalcification or microcalcifications are part of a cluster. If no, BI-RADS=2 is assigned. If yes, in step 2006, each microcalcification is analyzed to determine whether it is near the breast-air interface or near the chest wall datum. In this analysis, each microcalcification is separately analyzed. As an example of how nearness is determined, for a 9×9 SVM, it may suitably be determined whether a microcalcification is within 8 pixels of the 9×9 SVM.

If in step 2006, the answer is yes, in step 2008, each microcalcification near the breast air interface or near the chest wall datum line is evaluated to determine if it exhibits any one or more of a plurality of predetermined criteria, for example, whether it is pleomorphic, linear, branched or ductally oriented. If none of the microcalcifications meet any of the predetermined evaluation criteria, then BI-RADS=0 is assigned. If any one criteria is met, then BI-RADS=4 is assigned. If any two or more criteria are met, then BI-RADS=5 is assigned.

If in step 2006, the answer is no, then in step 2010, each microcalcification is analyzed to determine if it is arteriosclerotic or not. If yes, then BI-RADS=2 is assigned. If no, then the process 2000 proceeds to step 2012.

In step 2012, it is determined whether all of the microcalcifications are round or spherical or not. If the answer is yes, then BI-RADS=2 is assigned. Where one or more irregularly shaped microcalcifications have been detected so that the answer in step 2012 is no, the size of each such microcalcification is analyzed in step 2014.

More specifically, as illustrated in FIG. 20, a determination is made in step 2014 whether the microcalcifications being analyzed have a length greater than 0.5 mm along their short axis. If they do, such microcalcifications are analyzed in step 2016 to determine if they are radiologically dense. If yes, BI-RADS=2 is assigned.

If in either step 2014 or in step 2016, the determination is no, then in step 2018, the microcalcifications are evaluated with respect to a number of predetermined criteria. For example, it may suitably be determined whether any of the microcalcifications are pleomorphic, linear, branched or ductally oriented. Where none of the microcalcifications meet these criteria, BI-RADS=0 is assigned. If any one criteria is met, BI-RADS=4 is assigned. If any two criteria are met, BI-RADS=5 is assigned.

Figure 21:
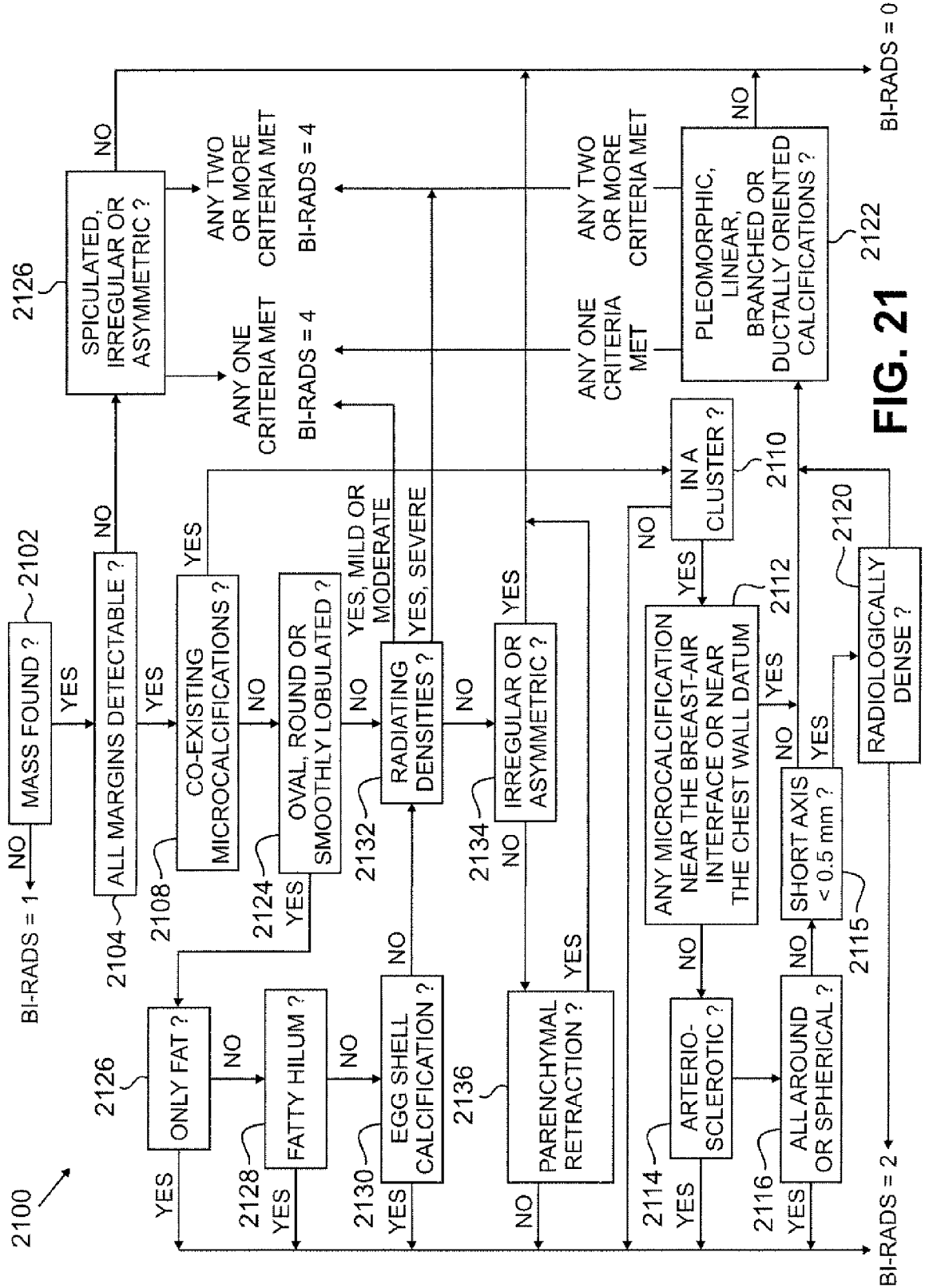

FIG. 21 illustrates an exemplary mass analysis process 2100 in accordance with the present invention. In step 2102, a determination is made as to whether a mass or masses have been found. If no, BIRADS=1 is assigned. If yes, an analysis is made in step 2104 as to whether all margins of each mass detected are detectable.

If the determination in step 2104 is no for all masses, then these masses are tested with respect to a predetermined set of criteria in step 2106. For example, in step 2106, the detected masses may suitably be tested to determine if they are speculated, irregular or asymmetric. If any one criteria is met, BIRADS=4 is assigned. If any two or more criteria are met, BI-RADS=5 is assigned.

Returning to step 2104, if the result is yes that all margins are detectable, then, in step 2108, it is determined whether there are coexisting microcalcifications. If yes, then in step 2110, it is determined whether the coexisting microcalcifications are located in a cluster. If not, BI-RADS=2 is assigned.

If in step 2110, a cluster is found, then in step 2112 a determination is made whether any microcalcifications are near the breast air interface or near the chest wall datum. This analysis is preferably performed in the same manner discussed above in connection with step 2006 of process 2000. If no, then in step 2114, the microcalcifications are tested to determine if they are arteriosclerotic. Where the answer is yes, BI-RADS=2 is assigned. Where the answer in step 2114 is no, a determination is made in step 2116 as to whether all the microcalcifications are round or spherical. If yes, then BI-RADS=2 is assigned. Where no, each microcalcification is further analyzed in step 2118 to determine if its short axis measures more than 0.5 mm. If yes, then a determination is made in step 2120 if the microcalcifications are radiologically dense. If yes, BI-RADS=2 is assigned.

If in either step 2118 or step 2120, the answer is no, process 2100 proceeds to step 2122 where the microcalcifications are tested against a set of predetermined criteria. For example, the microcalcifications may suitably be tested to determine if they are pleomorphic, linear, branched or ductally oriented. Where any one criteria is met, BI-RADS=4 is assigned unless a higher BI-RADS mass determination has been or is subsequently made, in which case the highest BI-RADS number is assigned. Where any two or more criteria are met, BI-RADS=5 is assigned.

Returning to step 2108, where no coexisting microcalcifications are found, in step 2124, the masses are evaluated to determine if they are oval, round or smoothly lobulated. If yes, an evaluation is made in step 2126 to determine if the masses are only of fat density. If yes, BI-RAD=2 is assigned. If in step 2126, all masses are not classified as only fat, in step 2128, the masses are evaluated to determine if they contain a fatty hilum. If yes, then BI-RADS=2 is assigned. If no, in step 2130, the masses are evaluated to determine if they are egg shell calcifications. If yes, then BI-RADS=2 is assigned.

If in step 2130, the answer is no, then the masses are further evaluated in step 2132 to determine if they exhibit radiating densities, and if so, the severity. If the answer is yes and mild or moderate, then BI-RADS=4 is assigned. If yes and severe, then BI-RADS=5 is assigned.

If in step 2132, the result is negative, then the masses are evaluated to determine if they are irregular or asymmetric in step 2134. If yes, BI-RADS=0 is assigned. Where no, the masses are analyzed in step 2136 to determine if parenchymal retraction is observed. If yes, then BI-RADS=0 is assigned. If no, then BI-RADS=2 is assigned.

Figure 22:
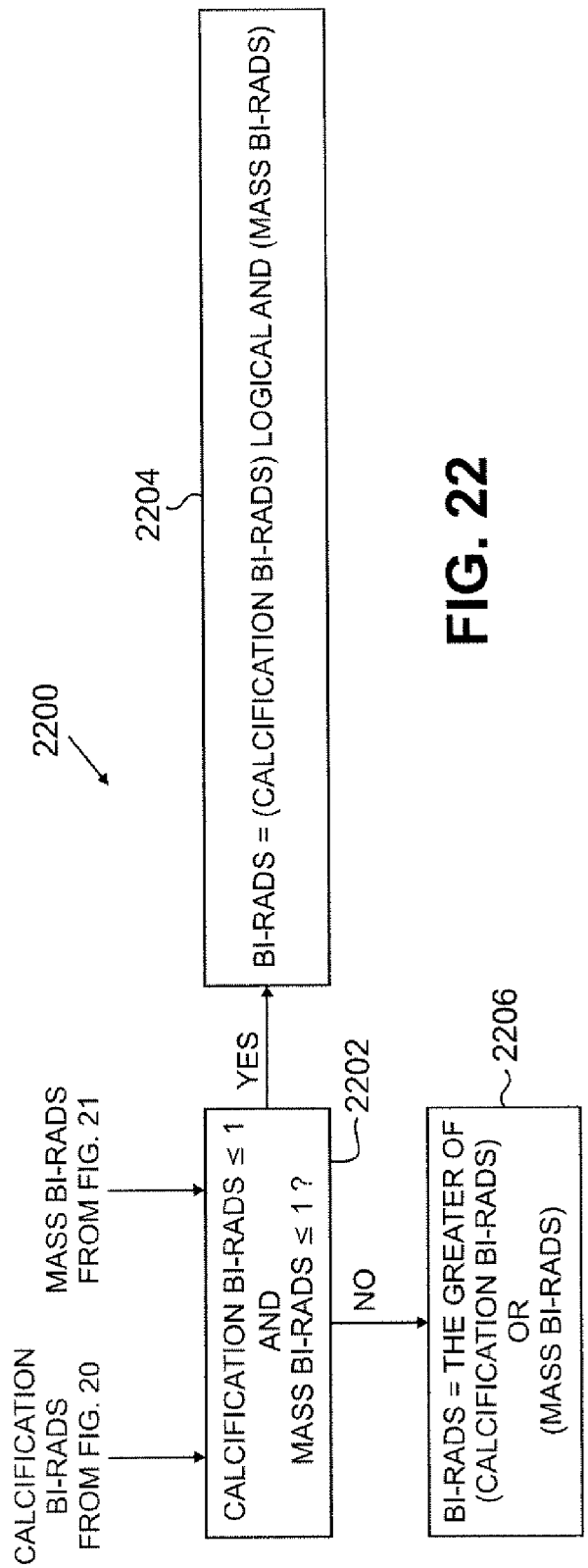

FIG. 22 illustrates an exemplary process 2200 for combining the results of the processes 2000 and 2100. In the process 2200, the calcification BI-RADS finding is received from process 2000 and the mass BI-RADS finding is received from process 2100. In step 2202, it is determined if the calcification BI-RADS is ≦1 and the mass BI-RADS is ≦1. If the answer is yes, then in step 2204 the final BI-RADS finding is assigned the value obtained by logically ANDing the calcification and mass findings. If no, then the ultimate BI-RADS finding is simply the greater of the two findings.

Further exemplary process detail and term definitions follow below.

File Import The CC and ML(O) views are converted from their native format to IFS. A software utility is utilized to convert loss-less JPEG (LJPEG) files to IFS.

Threshold. The breast region is identified by separating the image of the breast from the background, and, finds the chest-wall portion of the mammogram.

Histogram. The threshold for breast segmentation is suitably computed using a cross entropy threshold. This computation is performed twice to maintain the skin to air interface in the image. The breast portion of the image is identified by performing a connected components analysis and finding the largest area component, in terms of the number of pixels comprising the component. This step also eliminates noise pixels and patient, or film identifier label information that may have been applied by the mammography technician. The extracted breast image is then smoothed using a cubic polynomial filter. A B-spline curve is calculated to produce a smoothly varying breast air interface edge.

Chest wall detection: Chest wall detection may be suitable performed on the ML/MLO view as follows.

A) A 50×100 pixel window is applied to the top left or top right corner of the mammogram, depending on the image orientation. Cross-Entropy thresholding is used to calculate a threshold within the window.

B) The window size is increased, but the aspect ratio is maintained, and cross-entropy thresholding is performed again.

C) The above steps A) and B) are repeated until the window height reaches half the image height.

D) The inflection points are calculated from the set of thresholds obtained in steps A) to C) above. These are the probable chest wall thresholds.

E) The mean values of pixels within each window corresponding to the inflection points are calculated.

F) The thresholds of all inflection points windows whose mean value rate of change is greater than a given mean difference are averaged to obtain the final chest wall threshold value.

G) In the MLO view, the chest wall is restricted to no more than 16% of the total image height reserved from the top of the image to avoid confusion with the breast area.

Nipple Identifier: A nipple identifier function performs the function implied by its name. It determines the location of the nipple in each view. The nipple may be found by techniques known to those familiar with the art, but preferably is located as follows:

A) Find the skin and background interface.

B) Construct lines normal to that interface.

C) Calculate slope of these normal lines. Slopes will have inflection point if nipple is visible.

D) If nipple is visible, restrict step (E) to area around nipple. Otherwise, restrict normal lines to middle ⅓ of mammograms.

E) Calculate gray levels along the lines. Ducts appear as a modest white spike in an intensity gradient along a line. The nipple is located at the line with the largest intensity spike. All ducts terminate at the nipple resulting in cumulative intensity peaks.

Once the chest wall and the nipple have been located, a datum line is constructed normal to the chest wall datum and passing through the nipple.

Micro-calcification and mass finder: Micro-calcifications and masses may be suitably identified using techniques known to those skilled in the art, preferably using a support vector machine (SVM) learning algorithms. The SVM is first trained with physician-selected examples of micro-calcifications and examples of "not micro-calcifications". The same type of training is provided for masses. In a presently preferred SVM implementation, a nine-by-nine (9×9) pixel matrix (81 "dimension" vector is used to analyze and classify images. However, it will be recognized that other pixel matrix sizes, for example, an 11×11 pixel matrix, may be employed depending on the pixel resolution of the mammographic images to be analyzed. Micro-calcifications and masses are located, listed and filtered to reduce duplicate identification of the same lesion as the 9×9, or other size analysis matrix is applied to each target image and then translated one pixel horizontally until the edge of the image is encountered. The analysis matrix is then moved down nine pixels (or 11 pixels, for an 11×11 pixel matrix) and the next line is scanned.

The training set can be altered as desired by providing additional or replacement examples of micro-calcifications and not micro-calcifications to improve the detection accuracy. Similarly, the training set for masses can be updated at any time.

Transform: A transform function correlates the position of micro-calcifications on the CC view to their position in the ML/MLO view. To be a cluster, two or more micro-calcifications must lie within 1 cm of each other. The center of each cluster is computed as $C_i = 1/N \, \Sigma_j \, M_j$, where $C_i$ is the center of the $i^{th}$ cluster, $M_j$ are the micro-calcifications belonging to the $i^{th}$ cluster, and N is the total number of micro-calcifications in the $i^{th}$ cluster. Calculating the center of the cluster may result in some micro-calcifications used in the calculation to now fall outside the 1 cm radius from the newly calculated center of the cluster. These micro-calcifications are deleted from the cluster membership and the position of the center is recalculated. These steps are performed iteratively until convergence. In other words, the iteration continues until the cluster membership is stable.

Similarly, the transform function correlates the position of masses in the CC view to their position in the ML/MLO view. To be concordant, the coordinates of the center of the mass in the CC view must be within a distance M, of the coordinates of the mass in the ML/MLO view, where M is a parameter whose value is typically set at 1 cm, but may be set to a different value by the analyzing radiologist.

Cluster matching: A clustering algorithm may based on k-means clustering. The standard algorithm is hereby extended by determining the optimum number of clusters using a novel adaptive iteration method: (1) starting with an arbitrary number of clusters, for example, 2, with arbitrary center locations, compute the distance from each micro-calcification to each cluster center and assign the micro-calcification as a member of the closest cluster. (2) Calculate the new cluster centers, for example, the average of the location of all micro-calcification that members of the cluster. Any cluster whose diameter is now greater than the diameter parameter, discussed further below is broken up into two clusters with centers at the extremes of the original cluster. (3) Clusters with diameters less than the diameter parameter are joined. (4) Micro-calcifications are reassigned to a cluster based on the distance from each micro-calcification to the nearest cluster. (5) Steps (1) through (4) are repeated until no further splitting or merging of clusters occurs.

Clusters may be suitable correlated between the CC and ML/MLO views as follows: Beginning with the CC view, each cluster is projected onto the datum line passing through the nipple. In the ML/MLO view, a search is made for clusters at the same distance from the nipple as that obtained from the CC view, over a cylindrical area of diameter equal to the specified cluster diameter, such as 1 cm by default. Clusters containing more than one micro-calcification that are matched are labeled as concordant. If no matching cluster is found in the ML/MLO view, the CC view cluster is marked as discordant and is a single view finding. After all CC view clusters are processed, any remaining ML/MLO view clusters are marked as discordant single view findings.

Diameter Parameter: The diameter parameter operates to identify large numbers of micro-calcifications as a single cluster rather than as a large number of small, for example, 1 cm, or smaller diameter clusters. This is necessary for the proper interpretation and reporting of the mammographic study.

Mass matching: Masses may be suitably correlated between the CC and ML/MLO views as follows:

Beginning with the CC view, each mass is projected onto the datum line passing through the nipple. In the ML/MLO view, a search is made for masses at the same distance from the nipple as that obtained from the CC view, over a cylindrical area of diameter equal to the specified search diameter 1 cm by default. Masses that are matched are labeled as concordant. If no matching mass is found in the ML/MLO view, the CC view mass is marked as discordant and is a single view finding. After all CC view clusters are processed, any remaining ML/MLO view masses are marked as discordant single view findings.

The terms mammography and mammographic are used interchangeably in this document.

Apparent Cluster Two or more micro-calcifications separated in two dimensional space by no more than one centimeter on a single view, e.g. CC, MLO or ML view.

Density: (FIGS. 11-13) A bounded area of $\geq 7$ square millimeters ($mm^2$), or an enclosed area of diameter $\geq 3$ millimeters (mm), where the bounded or enclosed area has a radiographic density substantially greater or less than that of the average breast density, corrected for background. The location of a density (on the CC or ML/MLO view) is specified by the location of its center, calculated using the modal radius of a best fit circle from the detectable border(s).

Calcifications:
  Amorphous or Indistinct Calcifications: These are often round or flake shaped calcifications that are sufficiently small or hazy in appearance that a more specific morphologic classification cannot be determined.
  Pleomorphic or Heterogeneous Calcifications: These calcifications differ in their individual appearance and may be irregular in shape and/or density.
  Fine, Linear or Fine, Linear, Branching (Casting) Calcifications: These are thin, irregular calcifications that appear linear, but are discontinuous and under 0.5 mm in width. Their appearance suggests filling of the lumen of a duct involved irregularly by breast cancer.
  Benign Calcifications: Benign calcifications are usually larger than 0.5 mm in short axis. They often have a coarse appearance with smooth margins and very high radiographic density.

Cluster: Two or more micro-calcifications separated in three dimensional space by no more than one centimeter. A cluster's location is specified by the location of its center calculated as the geometric center of the micro-calcifications comprising the cluster, independent of the relative size of the constituent micro-calcifications.

Concordant: A lesion is concordant if the elements comprising the lesion are at the same physical location (± a tolerance) in 3-space; i.e. not a constellation artifact or a summation artifact.

Lesion: Any significant radiologic finding, including micro-calcifications or densities.

Mass: A mass is a density that is seen on, and is concordant in two different projections or views.
  a) Circumscribed (well-defined or sharply-defined) margins: The margins are sharply demarated with an abrupt transition between the lesion and the surrounding tissue.
  b) Indistinct of ill defined margins
  c) Spiculated Margins: The lesion is characterized by lines radiating from the margins of a mass.
  d) Masses are evaluated via the decision tree shown in FIG. 21.

Micro-calcification: A focal area $\leq 0.5$ mm in the shortest dimension with radiographic density $\geq 1,000\%$ of the average (mean) breast density, corrected for background.

Microcalcifications are identified via the "decision tree" shown in FIG. 15.

While presently preferred embodiments of the invention have been described, the present description is merely illustrative and is not intended to limit the present invention. For example, although the embodiments of the invention described above were in the context of a system for computer automated diagnosis and detection of breast lesions, including carcinoma, using mammography, those skilled in the art will recognize that the disclosed methods and structures are readily adaptable for broader applications. For example, the invention is applicable to many other types of CAD systems for automatic classification and detection of other types of medical abnormalities particularly where multiple two dimensional views of three dimensional regions of interest are analyzed.

We claim:

1. A method for computer automated diagnostic evaluation of breast mammograms using information extracted from digital data from a first mammogram view of the breast and digital data from a second mammogram view of the breast, utilizing a computer or processor to perform the steps of:
  locating plural lesions within a predetermined distance for said mammogram views by analyzing said digital data from the first and second mammograms to define apparent clusters;
  locating the nipple in both said views;
  constructing a chest wall datum line in both said views; constructing a chest wall nipple datum line perpendicular to the chest wall datum line and passing through the nipple in both said views;
  determining a distance of a first apparent cluster from the nipple in the first mammogram view;
  evaluating a second apparent cluster in the second mammogram view to determine if its position relative to the nipple is within a predetermined tolerance; and
  labeling the first and second apparent clusters as concordant if its respective position relative to the nipple is within the predetermined tolerance.

2. The method of claim 1, further comprising:
  determining a diameter parameter; and
  utilizing the diameter parameter to group plural concordant clusters for reporting purposes.

3. The method of claim 1, wherein the first and second apparent clusters are labeled discordant if the position of the second apparent cluster is not within the predetermined tolerance relative to the nipple.

4. The method of claim 1, wherein the determination of concordance and discordance is made by:
- calculating a distance, r, from the nipple to a particular apparent cluster in a CC view; and
- in an MLO view, calculating an arc with center at the nipple and radius equal to the distance r;
- adding and subtracting a predetermined distance, from r; and
- calculating two additional arcs, each of which has the nipple as its center and a radius equal to r plus the predetermined distance and r minus the predetermined distance, respectively;
- determining whether any apparent cluster in the MLO view lies between the arcs of radius r plus the predetermined distance and r minus the predetermined distance, respectively; and
- labeling an apparent cluster between the two arcs as concordant with the particular apparent cluster of the CC view and labeling any apparent cluster not between the arcs as discordant with respect to the apparent cluster of the CC view.

5. The method of claim 1, wherein a distance r' is calculated by multiplying the distance r and the cosine of an angle CNL formed between the chest wall to nipple datum line and a line from the nipple to an apparent cluster and labeling the apparent cluster between two arcs of radius r' plus the predetermined distance and r' minus the predetermined distance as concordant, and labeling any apparent cluster not between the arcs of radius r' plus the predetermined distance and r' minus the predetermined distance as discordant.

6. The method of claim 5, where a distance r' is calculated by multiplying the distance r and the cosine of the angle CNL and labeling an apparent cluster between the lines r' plus the predetermined distance and r' minus the predetermined distance, respectively, as concordant and labeling any apparent clusters not between the lines r' plus the predetermined distance and r' minus the predetermined distance, respectively, as discordant.

7. The method of claim 1, wherein the determination of concordance and discordance is made for a focal density by:
- calculating a distance, r, from the nipple to a focal density in a CC view; and
- in the MLO view, calculating a datum line perpendicular to the chest wall nipple datum line at the distance r, from the nipple along the chest wall nipple datum line;
- adding and subtracting a predetermined distance, from r;
- establishing two additional lines r plus the predetermined distance and r minus the predetermined distance, each of which is perpendicular to the chest wall nipple line at a distance r plus the predetermined distance and r minus the predetermined distance, respectively;
- determining whether any focal densities lie between the two additional lines; and
- labeling a focal density between the two additional lines as concordant and any focal densities not between the two additional lines as discordant.

* * * * *